US012628021B2

(12) United States Patent
Calcev et al.

(10) Patent No.: US 12,628,021 B2
(45) Date of Patent: May 12, 2026

(54) METHOD AND APPARATUS FOR RECEIVER ASSISTED TRANSMISSION IN SHARED SPECTRUM

(71) Applicant: Huawei Technologies Co., Ltd., Shenzhen (CN)

(72) Inventors: George Calcev, Hoffman Estates, IL (US); Weimin Xiao, Hoffman Estates, IL (US)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 484 days.

(21) Appl. No.: 18/164,498

(22) Filed: Feb. 3, 2023

(65) Prior Publication Data

US 2023/0189020 A1      Jun. 15, 2023

Related U.S. Application Data

(63) Continuation      of      application      No. PCT/US2021/044693, filed on Aug. 5, 2021.

(Continued)

(51) Int. Cl.
*H04W 24/08*          (2009.01)
*H04W 24/10*          (2009.01)
(Continued)

(52) U.S. Cl.
CPC ........... *H04W 24/10* (2013.01); *H04W 24/08* (2013.01); *H04W 28/0205* (2013.01);
(Continued)

(58) Field of Classification Search
CPC ..... H04W 8/22–245; H04W 16/14–28; H04W 24/02–10; H04W 28/02–065; H04W 48/02–20; H04W 72/02–569; H04W 74/002–0891; H04W 84/02–16; H04W 88/02–12; H04W 92/02–04; H04W 92/10
See application file for complete search history.

(56) References Cited

U.S. PATENT DOCUMENTS

2017/0202018 A1      7/2017  Cha et al.
2019/0174542 A1*     6/2019  Lei ...................... H04W 74/006
(Continued)

OTHER PUBLICATIONS

"3rd Generation Partnership Project; Technical Specification Group Radio Access Network; Physical layer procedures for shared spectrum channel access (Release 16)," 3GPP TS 37.213 V16.3.0 (Sep. 2020); 26 pages.
"3rd Generation Partnership Project; Technical Specification Group Radio Access Network; NR; Physical layer procedures for control (Release 16)," 3GPP Ts 38.213 V16.5.0 (Mar. 2021); 183 pages.

(Continued)

*Primary Examiner* — Timothy J Weidner
(74) *Attorney, Agent, or Firm* — Slater Matsil, LLP

(57)          ABSTRACT

An access node such as a gNB, when determining that a communication channel in a shared spectrum is clear, may send downlink control information (DCI) triggering a user equipment (UE) to measure a resource to determine whether the communication channel is available for the UE. The UE, triggered by the DCI, may measure received energy on resource, generate a measurement report and send the measurement report to the access node. The access node may determine whether to transmit data to the UE in the communication channel based on the measurement report.

16 Claims, 13 Drawing Sheets

Related U.S. Application Data

(60) Provisional application No. 63/062,204, filed on Aug. 6, 2020.

(51) Int. Cl.

| | |
|---|---|
| *H04W 28/02* | (2009.01) |
| *H04W 28/04* | (2009.01) |
| *H04W 74/00* | (2009.01) |
| *H04W 74/08* | (2024.01) |
| *H04W 74/0816* | (2024.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.

CPC ......... *H04W 28/04* (2013.01); *H04W 74/004* (2013.01); *H04W 74/006* (2013.01); *H04W 74/0816* (2013.01); *H04W 74/0866* (2013.01); *H04W 84/02* (2013.01); *H04W 88/02* (2013.01); *H04W 88/08* (2013.01); *H04W 92/02* (2013.01); *H04W 92/10* (2013.01)

(56) References Cited

U.S. PATENT DOCUMENTS

| | | | |
|---|---|---|---|
| 2019/0357255 A1 | 11/2019 | Sun et al. | |
| 2022/0311491 A1* | 9/2022 | He | H04W 74/006 |
| 2024/0188128 A1* | 6/2024 | Cao | H04W 74/006 |

OTHER PUBLICATIONS

"3rd Generation Partnership Project; Technical Specification Group Radio Access Network; NR; Physical layer procedures for data (Release 16)," 3GPP TS 38.214 V16.5.0 (Mar. 2021); 171 pages.

"3rd Generation Partnership Project; Technical Specification Group Radio Access Network; NR; Physical layer measurements (Release 16)", 3GPP TS 38.215 V16.4.0, Technical Specification, (Dec. 2020); 25 Pages.

"3rd Generation Partnership Project; Technical Specification Group Radio Access Network; NR; Radio Resource Control (RRC) protocol specification (Release 16)," 3GPP TS 38.331 V16.4.1 (Mar. 2021); 949 pages.

ETSI; Harmonised European Standard; "5 GHz RLAN; Harmonised Standard covering the essential requirements of article 3.2 of Directive 2014/53/EU," ETSI EN 301 893, V2.1.1; (May 2017); 122 pages.

IEE Standards Association; IEEE Standard for Information technology; Telecommunications and information exchange between systems; Local and metropolitan area networks; Specific requirements; IEEE Std 802.11 (2016); New York, NY; 3534 pages.

* cited by examiner (>=20μs;
THRESHOLD
-73dBm/MHz+
(23-maxEIRP))

400

CCA

CCA

UUT CCA

UUT
TRANSMISSIONS

IDLE PERIOD
(> = 5%
OCCUPANCY
AND 50μs)

CHANNEL OCCUPANCY TIME (1~10ms)

FIXED FRAME PERIOD

START

502 — RECEIVE WAVEFORM SIGNAL

504 — PROCESS SIGNAL AND GENERATE
DECISION VARIABLE X

IS X <
THRESHOLD
T?

506

NO

YES

508 — OUTPUT "YES, IDLE"

OUTPUT "NO, BUSY" — 510

END

500

900

DIRECTIONAL
INTERFERER
920

910
ED SENSING
RANGE

1000

1600

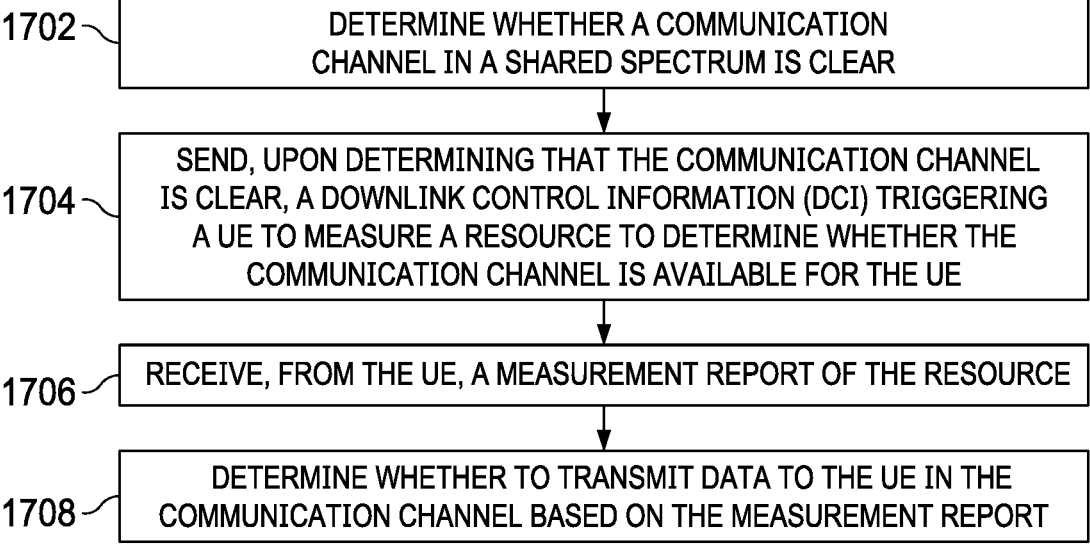

1702 — DETERMINE WHETHER A COMMUNICATION CHANNEL IN A SHARED SPECTRUM IS CLEAR

1704 — SEND, UPON DETERMINING THAT THE COMMUNICATION CHANNEL IS CLEAR, A DOWNLINK CONTROL INFORMATION (DCI) TRIGGERING A UE TO MEASURE A RESOURCE TO DETERMINE WHETHER THE COMMUNICATION CHANNEL IS AVAILABLE FOR THE UE

1706 — RECEIVE, FROM THE UE, A MEASUREMENT REPORT OF THE RESOURCE

1708 — DETERMINE WHETHER TO TRANSMIT DATA TO THE UE IN THE COMMUNICATION CHANNEL BASED ON THE MEASUREMENT REPORT

FIG. 17

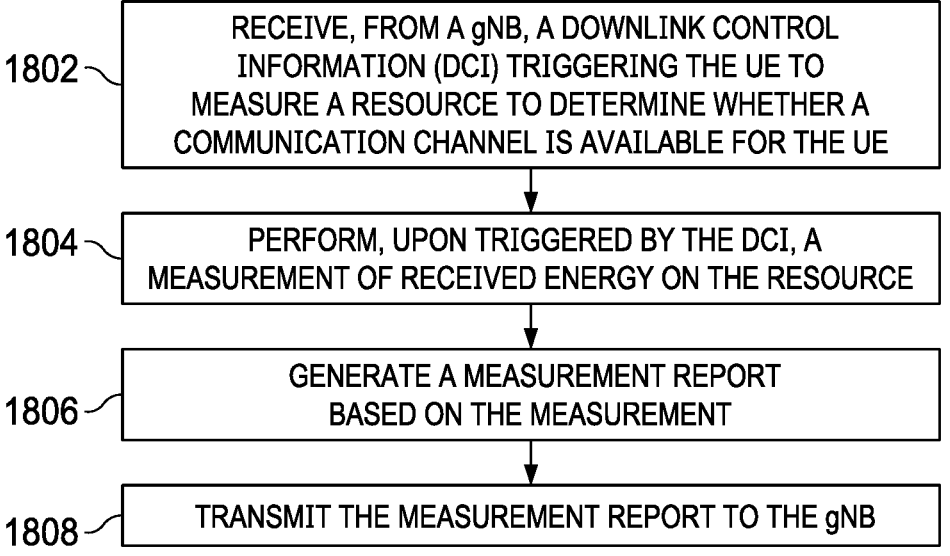

1802 — RECEIVE, FROM A gNB, A DOWNLINK CONTROL INFORMATION (DCI) TRIGGERING THE UE TO MEASURE A RESOURCE TO DETERMINE WHETHER A COMMUNICATION CHANNEL IS AVAILABLE FOR THE UE

1804 — PERFORM, UPON TRIGGERED BY THE DCI, A MEASUREMENT OF RECEIVED ENERGY ON THE RESOURCE

1806 — GENERATE A MEASUREMENT REPORT BASED ON THE MEASUREMENT

1808 — TRANSMIT THE MEASUREMENT REPORT TO THE gNB

1914 — INTERFACE

1910 — INTERFACE    1904 — PROCESSOR    1912 — INTERFACE

1906 — MEMORY

2000

2012 — DEVICE-SIDE INTERFACE(S)    2010 — SIGNAL PROCESSOR    2006 — TRANSMITTER    2004 — COUPLER    2002 — NETWORK-SIDE INTERFACE(S)

2008 — RECEIVER

METHOD AND APPARATUS FOR RECEIVER ASSISTED TRANSMISSION IN SHARED SPECTRUM

CROSS-REFERENCE TO RELATED APPLICATIONS

This application is continuation of International Application No. PCT/US2021/044693 filed on Aug. 5, 2021, which claims the benefit of U.S. Provisional Application No. 63/062,204 filed on Aug. 6, 2020, which applications are hereby incorporated herein by references.

TECHNICAL FIELD

The present disclosure relates generally to wireless communication, and in particular embodiments, to techniques and mechanisms for receiver assisted transmission in a shared or unlicensed spectrum.

BACKGROUND

Licensed exempt spectrum, also known as unlicensed spectrum or shared spectrum, has recently attracted a lot of interest from cellular operators. Long Term Evolution licensed assisted access (LTE-LAA) was specified in 3GPP LTE releases (Rel) 13 and 14. More recently in New Radio Unlicensed (NR-U), the operation in unlicensed spectrum (or shared spectrum) was specified in release 16 (3GPP TS 38.213, which is hereby incorporated herein by reference in its entirety) for 3GPP New Radio (NR).

3GPP and IEEE technologies operating in unlicensed spectrum use listen before talk (LBT) channel access. In certain regions, such as European Union (EU) and Japan, a LBT rule is generally enforced by spectrum regulators to reduce interference risks and to offer a fairer coexistence mechanism. The LBT mechanism requires a transmitter to check, before a transmission, if there are other occupants of a channel and postpone the transmission if the channel is occupied.

In particular, the LBT rule in EU, specified in European Telecommunications Standards Institute (ETSI) European Standard (EN) 301893 for 5 GHz band, uses clear channel assessment (CCA) to determine if a channel is available for transmission. CCA checks if energy received on a channel is above a CCA threshold. If the energy detected exceeds a CCA threshold, the channel is considered in use (busy), otherwise, the channel is considered idle. If the channel is idle, a transmitter can transmit for a duration of a channel occupancy time (COT) in a bandwidth that is at least a portion, e.g., 80%, of a total channel bandwidth. The maximum COT duration for a transmission burst is also specified in ETSI EN 301893, which is hereby incorporated herein by reference in its entirety. The maximum COT (MCOT) duration adopted in 3GPP NR-U Rel 16 (TS 37.213, which is hereby incorporated herein by reference in its entirety) is a function of a channel access priority class (CAPC). As defined in TS 37.213, for determining a COT, if a transmission gap (an interval between consecutive transmissions) is less than or equal to 25 us, the transmission gap duration is counted in the COT. A transmission burst is defined as a set of transmissions with gaps (i.e., transmission gaps) no more than 16 us, and if the gaps are greater than 16 us, the set of transmissions are considered separate.

3GPP Rel 16 (TS 37.213) defines several types of channel access in unlicensed spectrum, for downlink (DL) and uplink (UL).

In Type 1 DL channel access, a gNB may transmit after first sensing a channel to be idle during sensing slot durations of a defer duration $T_d$ and after a randomly initiated counter N, which is decremented in each idle sensing slot, is zero. A sensing slot duration may be 9 us. Type 1 DL channel access may be used before starting a new COT, where the COT duration can be up to 10 ms depending on traffic priority.

Type 2 DL channel access includes a deterministic duration of channel sensing, during which a channel needs to be sensed as idle. Type 2 DL channel access includes Type 2A, Type 2B and Type 2C channel accesses.

Type 2A channel access allows a transmission if the channel is sensed idle for at least a sensing interval of 25 us prior to transmission.

Type 2B channel access allows a transmission if the channel is sensed idle for at least a sensing interval of 16 us prior to transmission.

Type 2C channel access allows a transmission for a duration of no more than 584 us without channel sensing prior to transmission.

Type 2A DL channel access procedures are applicable in shared COT following a user equipment (UE) transmission, and for transmissions that includes a discovery burst with a duration of at most 1 ms and a duty cycle at most 1/20.

Type 2B or Type 2C DL channel access procedures are applicable following transmission(s) by a UE after a gap of 16 us or up to 16 us, respectively, in a shared channel occupancy.

Similarly to the DL channel access types, TS 37.213 defines UL channel access procedures, where Type 1 UL channel access is based on sensing channel being idle for a defer fixed duration Td and then until a random backoff counter N decremented for each idle sensing slot reaches zero, as in Type 1A DL channel access. Type 2 UL channel access requires that the channel to be sensed as idle for a fixed (deterministic) duration before transmissions, where Type 2A UL channel access requires at least a 25 us channel idle duration before transmission, and Type 2B UL channel access requires at least a 16 us of channel idle duration before transmissions. Type 2C allows for transmissions of at most 584 us length without any channel sensing.

SUMMARY

Technical advantages are generally achieved, by embodiments of this disclosure which describe a method and apparatus for receiver assisted transmission in shared spectrum.

According to one aspect of the present disclosure, a method is provided that includes: determining, by a gNB, whether a communication channel in a shared spectrum is clear for use when data is to be sent to a first user equipment (UE) by the gNB; sending, by the gNB upon determining that the communication channel is clear, a first downlink control information (DCI) triggering the first UE to measure a resource to determine whether the communication channel is available for the first UE; receiving, by the gNB from the first UE after sending the first DCI, a first measurement report of measurement of the resource; and determining, by the gNB, whether to transmit the data to the first UE in the communication channel based on the first measurement report.

Optionally, in any of the preceding aspects, the method further includes: transmitting, by the gNB when determining that the communication channel is available for the first UE based on the first measurement report, the data to the first UE in the communication channel.

Optionally, in any of the preceding aspects, the method further includes: receiving, by the gNB from the first UE, a negative acknowledge (NACK) message indicating that the data is not successfully received by the first UE; receiving, by the gNB from the first UE after receiving the NACK message, a second measurement report of the measurement of the resource; and retransmitting, by the gNB when determining that the communication channel is available for the first UE based on the second measurement report, the data to the first UE in the communication channel.

Optionally, in any of the preceding aspects, the method further includes: after receiving the first measurement report and before transmitting the data, re-determining, by the gNB, that the communication channel is available.

Optionally, in any of the preceding aspects, the data is transmitted in the resource or in a subset of the resource.

Optionally, in any of the preceding aspects, the method further includes: sending, by the gNB when determining that the communication channel is unavailable for the first UE based on the first measurement report, a second DCI triggering the first UE to re-measure the resource to determine whether the communication channel is available for the first UE.

Optionally, in any of the preceding aspects, the communication channel is unavailable for the first UE, and the method further comprises: receiving, by the gNB from the first UE within a preset period after receiving the first measurement report, a second measurement report; and transmitting, by the gNB, the data to the first UE when determining that the communication channel is available for the first UE based on the second measurement report.

Optionally, in any of the preceding aspects, determining, by the gNB, whether the communication channel is clear comprises: performing, by the gNB, a clear channel assessment (CCA) on the communication channel.

Optionally, in any of the preceding aspects, the resource comprises one or more carriers, or one or more resource sets.

Optionally, in any of the preceding aspects, the resource comprises a channel state information-interference measurement (CSI-IM) resource or a CSI-IM resource set.

Optionally, in any of the preceding aspects, the resource comprises a channel state information-reference signal (CSI-RS) resource or a CSI-RS resource set.

Optionally, in any of the preceding aspects, the resource comprises a carrier bandwidth, or a subset of the carrier bandwidth.

Optionally, in any of the preceding aspects, the resource comprises a time resource, a frequency resource, a spatial resource, or a combination thereof.

Optionally, in any of the preceding aspects, the first measurement report indicates: whether detected energy on the resource or a subset of the resource exceeds a threshold; whether the resource or the subset of the resource is idle; or the detected energy on the resource or the subset of the resource.

Optionally, in any of the preceding aspects, the first measurement report comprises an interference measurement indicator (IMI) indicating a measurement result of the resource or the subset of the resource.

Optionally, in any of the preceding aspects, the method further includes: transmitting, by the gNB, first information of the resource.

Optionally, in any of the preceding aspects, the method further includes: transmitting, by the gNB, second information comprising any one or more of following: a resource for reporting a resource measurement; quasi co-location (QCL) information of a measurement resource; a transmission configuration indication (TCI) state indicating a QCL type of the measurement resource; a measurement time period of the resource measurement; or a measurement threshold.

Optionally, in any of the preceding aspects, the first information or the second information is transmitted in the first DCI or via a higher layer signaling.

Optionally, in any of the preceding aspects, transmitting the first DCI comprises: transmitting, by the gNB, the first DCI to a group of UEs including the first UE, triggering each of the group of UEs to measure a corresponding resource to determine whether the communication channel is available for a corresponding UE.

Optionally, in any of the preceding aspects, the first DCI has cyclic redundancy check (CRC) scrambled using a group radio network temporary identifier (RNTI) associated with the group of UEs, and the first DCI comprises, for each UE, one or more of following: the corresponding resource of the corresponding UE; QCL information of the corresponding measurement resource of the corresponding UE; a measurement time window; a measurement threshold; or a resource for reporting a measurement.

Optionally, in any of the preceding aspects, the first DCI further comprises a field configured to request the first UE to report an L1-IM report or a CSI-RS report on the measurement of the resource.

Optionally, in any of the preceding aspects, the first DCI further comprises any one or more of following: a channel state information-interference measurement (CSI-IM) time domain indicator indicating a CSI-IM configuration for an interference measurement; a parameter Periodicity-and-Offset indicating a periodicity and a timing offset for the interference measurement and reporting; or a parameter IMI Bit Length indicating a number of bits used to encode a measurement result of the interference measurement.

Optionally, in any of the preceding aspects, the first DCI further comprises any one or more of following: a channel state information-interference measurement (CSI-IM) time domain indicator indicating a CSI-IM configuration for interference statistics measurement; a parameter Periodicity-and-Offset indicating a periodicity and a timing offset for the interference statistics measurement and reporting; or a parameter Statistics-Type indicating a type of interference statistics per resource to be reported by the UE, the type of interference statistics comprising an average clear channel duration, a standard deviation of clear channel durations, an average busy channel duration, a longest clear channel duration, a shortest clear channel duration, a longest busy channel duration, or a shortest busy channel duration for a duration of a measurement period.

According to another aspect of the present disclosure, a method is provided that includes: receiving, by a user equipment (UE) from a gNB, a first downlink control information (DCI) triggering the UE to measure a resource to determine whether a communication channel in a shared spectrum is available for the UE; performing, by the UE upon triggered by the DCI, a first measurement of received energy on the resource; generating, by the UE, a first measurement report based on the first measurement; and transmitting, by the UE to the gNB, the first measurement report.

Optionally, in any of the preceding aspects, the method further includes: receiving, by the UE from the gNB when the communication channel is available for the UE, data in the communication channel of the shared spectrum after transmitting the first measurement report.

Optionally, in any of the preceding aspects, the method further includes: transmitting, by the UE to the gNB, a negative acknowledge (NACK) message indicating that the data is not successfully received by the UE; performing, by the UE, a second measurement of received energy on the resource to determine whether the communication channel is available; transmitting, by the UE to the gNB, a second measurement report, the second measurement report based on the second measurement; and receiving, by the UE after transmitting the second measurement report, the data retransmitted by the gNB in the communication channel of the shared spectrum.

Optionally, in any of the preceding aspects, the data is received in the resource or in a subset of the resource.

Optionally, in any of the preceding aspects, the method further includes: receiving, by the UE from the gNB when the communication channel is unavailable for the UE, a second DCI triggering the UE to re-measure the resource to determine whether the communication channel is available.

Optionally, in any of the preceding aspects, the communication channel is unavailable for the UE, and the method further comprises: performing, by the UE, a second measurement on the resource to generate a second measurement report; transmitting, by the UE to the gNB, the second measurement report; and receiving, by the UE after transmitting the second measurement report, the data from the gNB in the communication channel.

Optionally, in any of the preceding aspects, the resource comprises one or more carriers, or one or more resource sets.

Optionally, in any of the preceding aspects, the resource comprises a channel state information-interference measurement (CSI-IM) resource or a CSI-IM resource set.

Optionally, in any of the preceding aspects, the resource comprises a channel state information-reference signal (CSI-RS) resource or a CSI-RS resource set.

Optionally, in any of the preceding aspects, the resource comprises a carrier bandwidth, or a subset of the carrier bandwidth.

Optionally, in any of the preceding aspects, the resource comprises a time resource, a frequency resource, a spatial resource, or a combination thereof.

Optionally, in any of the preceding aspects, the first measurement report indicates: whether detected energy on the resource or a subset of the resource exceeds a threshold; whether the resource or the subset of the resource is idle; or the detected energy on the resource or the subset of the resource.

Optionally, in any of the preceding aspects, the first measurement report comprises an interference measurement indicator (IMI) indicating a measurement result of the resource or a subset of the resource.

Optionally, in any of the preceding aspects, performing the first measurement comprises: generating, by the UE, a component carrier received signal strength indicator (CC-RSSI) based on the received energy on the resource during a measurement period.

Optionally, in any of the preceding aspects, the method further includes: receiving, by the UE, first information of the resource from the gNB.

Optionally, in any of the preceding aspects, the method further includes: receiving, by the UE from the gNB, second information comprising any one or more of following: a resource for reporting a resource measurement; quasi co-location (QCL) information of a measurement resource; a transmission configuration indication (TCI) state indicating a QCL type of the measurement resource; a measurement time period of the resource measurement; or a measurement threshold.

Optionally, in any of the preceding aspects, the first information or the information is received in the first DCI or via a higher layer signaling.

Optionally, in any of the preceding aspects, the first DCI triggers each of a group of UEs to measure a corresponding resource to determine whether the communication channel is available for a corresponding UE.

Optionally, in any of the preceding aspects, the first DCI has cyclic redundancy check (CRC) scrambled using a group radio network temporary identifier (RNTI) associated with the group of UEs.

Optionally, in any of the preceding aspects, the first DCI further comprises a field configured to request the UE to report an L1-IM report or a CSI-IM report.

Optionally, in any of the preceding aspects, the first DCI further comprises any one or more of following: a channel state information-interference measurement (CSI-IM) time domain indicator indicating a CSI-IM configuration for an interference measurement; a parameter Periodicity-and-Off-set indicating a periodicity and an offset for the interference measurement and reporting; or a parameter IMI Bit Length indicating a number of bits used to encode a measurement result of the interference measurement.

Optionally, in any of the preceding aspects, the first measurement report comprises an interference statistics measurement indicator (STA-IMI) indicating statistics of measurement results of the resource or a subset of the resource, the statistics comprising an average clear channel duration, a standard deviation of the clear channel durations, an average busy channel duration, a longest clear channel duration, a shortest clear channel duration, a longest busy channel duration, a shortest busy channel duration for a duration of a measurement period.

According to another aspect of the present disclosure, an apparatus is provided that includes: a non-transitory memory storage comprising instructions; and one or more processors in communication with the memory storage, wherein the instructions, when executed by the one or more processors, cause the apparatus to perform a method in any of the p receding aspects.

According to another aspect of the present disclosure, a non-transitory computer-readable media is provided. The non-transitory computer-readable media stores computer instructions that when executed by one or more processors of an apparatus, cause the apparatus to perform a method in any of the preceding aspects.

According to another aspect of the present disclosure, a system is provided that includes: a user equipment (UE); and a gNB in communication with the UE; and wherein the gNB is configured to perform: determining whether a communication channel in a shared spectrum is clear for use when data is to be sent to the UE by the gNB; sending, upon determining that the communication channel is available, a downlink control information (DCI) triggering the UE to measure a resource to determine whether the communication channel is available for the UE; receiving, from the UE after sending the DCI, a measurement report of measurement of the resource; determining whether to transmit the data to the UE in the communication channel based on the measurement report; and wherein the UE is configured to perform: receiving, from the gNB, the DCI; performing, upon triggered by the DCI, a first measurement of received energy on the resource; generating the measurement report based on the first measurement; and transmitting the measurement report.

The above aspects enable a transmitter to obtain interference information of a channel in a shared spectrum at a receiver, and determine interference status at the receiver and determine whether to transmit to the receiver based on interference status. This greatly improves communication performance in the shared spectrum.

BRIEF DESCRIPTION OF THE DRAWINGS

For a more complete understanding of the present invention, and the advantages thereof, reference is now made to the following descriptions taken in conjunction with the accompanying drawings, in which:

For a more complete understanding of the present disclosure, and the advantages thereof, reference is now made to the following descriptions taken in conjunction with the accompanying drawings, in which:

FIG. 17 is a diagram of another embodiment method for receiver-assisted channel access in an unlicensed spectrum;

FIG. 18 is a diagram of another embodiment method for receiver-assisted channel access in an unlicensed spectrum;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Wireless communications using licensed exempt spectrum, also known as unlicensed spectrum or shared spectrum, has been considered and discussed in order to expand communication spectrum and capacity. However, communications using the shared spectrum may experience degraded performance due to unpredictable interferences, especially in cases of communications in high frequency bands. For example, a transmitter may detect that a channel is available to use and perform a directional transmission to a receiver on the channel, while the receiver may experience interference from another directional transmission, which is not detected by the transmitter. It would be desirable to provide mechanisms that can mitigate or avoid interferences on the receiver side.

Embodiments of the present disclosure provide methods for receiver-assisted channel access in cellular networks. In some embodiments, a receiver may provide interference information at the receiver side to a transmitter. The information may help the transmitter make a decision on subsequent data transmissions to the receiver. As an example, based on the information, the transmitter may avoid transmitting to the receiver, e.g., in a direction, if the receiver is heavily interfered in the direction. As another example, the transmitter may determine, based on the information, a modulation and coding scheme (MCS) level for the receiver, or selectively use a shared spectrum channel having a better interference situation.

In some embodiments, a gNB, when determining that a communication channel in a shared spectrum is clear for use, may send downlink control information (DCI) triggering a user equipment (UE) to measure one or more resources to determine whether the communication channel is available for the UE. The resources may include carriers. The resources may include time resources of the communication channel, frequency resources of the communication channel, spatial resources (e.g., beam directions) of the communication channel, or a combination thereof. The UE, triggered by the DCI, may measure received energy on the one or more resources, generate a measurement report and send the measurement report to the gNB. The gNB may determine whether to transmit data to the UE in the communication channel based on the measurement report.

Figure 1:
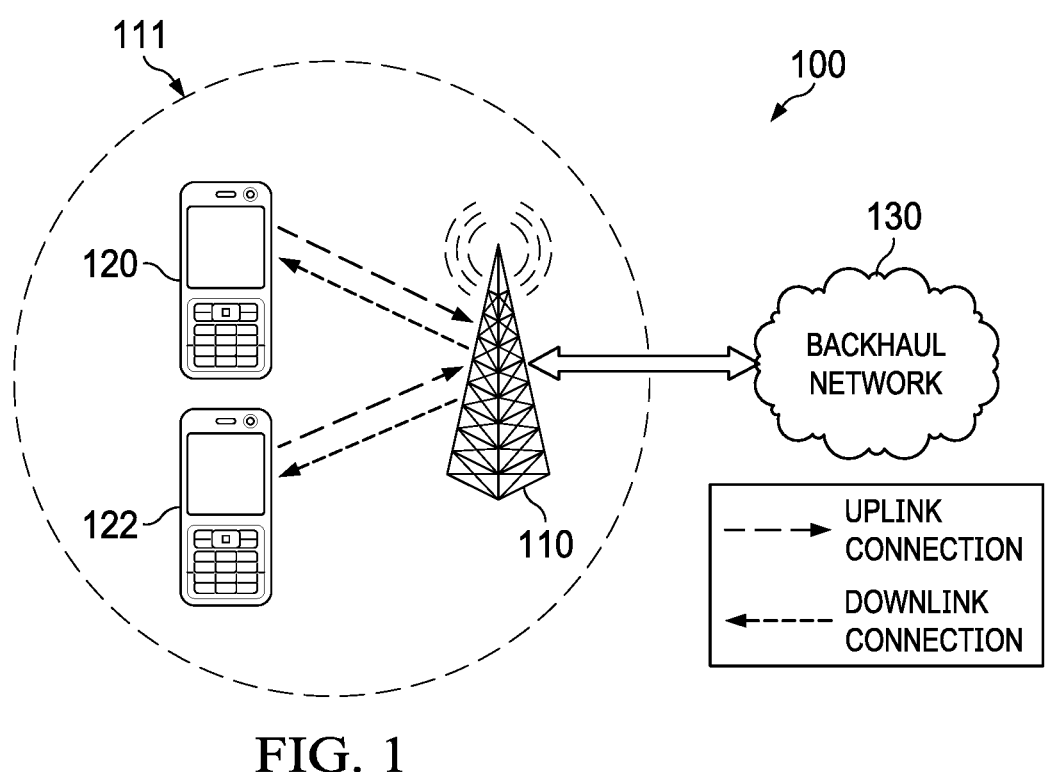
FIG. 1 is a diagram of an embodiment wireless communications network.

FIG. 1 illustrates an example wireless communication system 100. Communication system 100 includes an access node 110 with coverage area 111. Access node 110 serves a plurality of user equipments (UEs), including UE 120 and UE 122. Transmissions from access node 110 to a UE is referred to as a downlink (DL) transmission and occurs over a downlink channel (shown in FIG. 1 as a solid arrowed line), while transmissions from a UE to access node 110 is referred to as an uplink (UL) transmission and occurs over an uplink channel (shown in FIG. 1 as a dashed arrowed line). Services may be provided to the plurality of UEs by service providers connected to access node 110 through a backhaul network 130, such as the Internet. The wireless communication system 100 may include multiple distributed access nodes no.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, terminal devices, users, subscribers, stations, communication devices, CPEs, relays, Integrated Access and Backhaul (JAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth pails (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary (non-SUL) UL carrier which has an associated DL, and other carriers are called supplementary UL (SUL) carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple access nodes capable of communicating with a number of UEs, only one access node, and two UEs are illustrated for simplicity.

Figure 2:
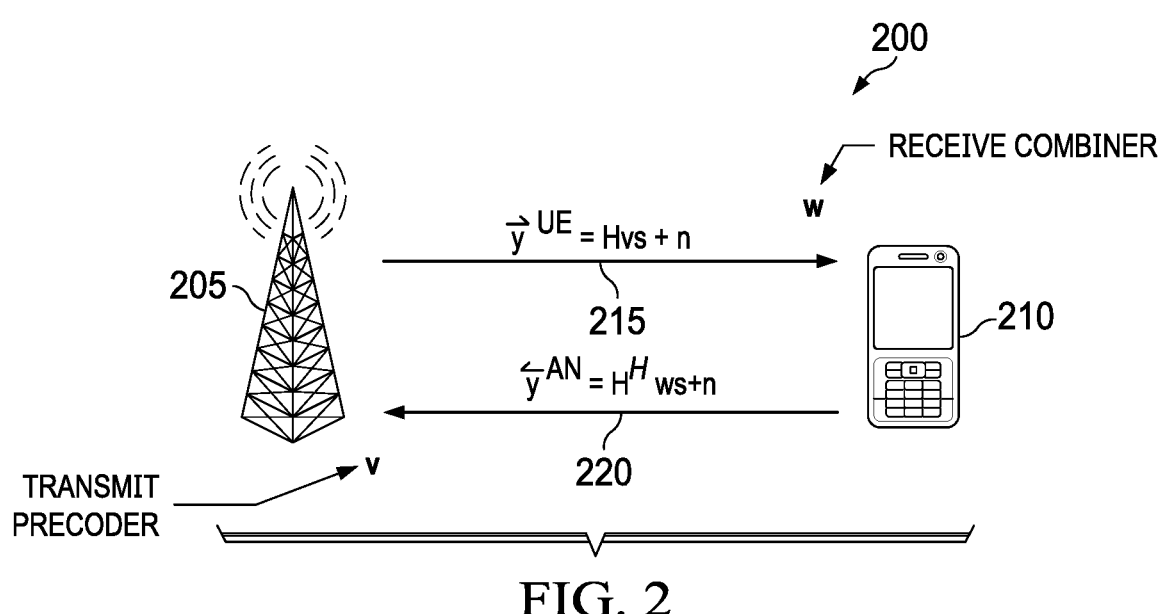
FIG. 2 is an embodiment communications system, providing mathematical expressions of signals transmitted in the communications system.

FIG. 2 illustrates an example communications system 200, providing mathematical expressions of signals transmitted in the communications system 200. Communications system 200 includes an access node 205 communicating with a UE 210. As shown in FIG. 2, access node 205 is using a transmit filter v and UE 210 is using a receive filter w. Both access node 205 and UE 210 use linear precoding or combining. Assuming a channel matrix (or channel model or channel response) H is an $N_{rx} \times N_{tx}$ matrix of a multiple-input multiple-output (MIMO) system, i.e., there are $N_{tx}$ transmit antennas and $N_{rx}$ receive antennas. The transmit filter v of dimension $N_{tx} \times Ns$ enables the transmitter to precode or beamform the transmitted signal, where Ns is the number of layers, ports, streams, symbols, pilots, messages, data, or known sequences transmitted. The receive filter w of multi-antenna systems is of dimension $N_{rx} \times Ns$ and represents the combining matrix, which is usually applied on the received signal y according to $w^H y$. The above description is for a transmission from access node 205 to UE 210, i.e., a DL transmission. The transmission may also occur at the reverse direction (an UL transmission), for which the channel matrix becomes $H^H$ in the case of TDD (where $H^H$ is the Hermitian of channel model H), and w may be seen as the transmit filter and v as the receiver filter. The w for transmission and the w for reception may or may not be the same, and likewise for v.

A DL (or forward) channel 215 between access node 205 and UE 210 has channel model or response H, while an UL (or backward, or reverse) channel 220 between UE 210 and access node 205 has channel model or response $H^H$. (Another convention is that the UL channel is denoted as $H^T$, which is the transposition of channel model H). Although FIG. 2 depicts only one access node and one UE, communication system 200 is not limited to this case. Multiple UEs may be served by the access node, on different time-frequency resources (such as in frequency division multiplexed-time division multiplexed (FDM-TDM) communication systems, as in typical cellular systems) or on the same time-frequency resources (such as in multi-user MIMO (MU-MIMO) communication systems, wherein multiple UEs are paired together and transmissions to each UE are individually precoded). Among the paired UEs, there is intra-cell interference.

Also, multiple access nodes may exist in the network, some of which may be cooperatively serving UE 210 in a joint transmission fashion (such as in coherent joint transmission, non-coherent joint transmission, coordinated multipoint transmission, etc.), a dynamic point switching fashion, and so on. Some other access nodes may not serve UE 210 and their transmissions to their own UEs cause inter-cell interference to UE 210. The scenario of multiple access nodes and multiple UEs, with access node cooperation to serve a UE and with MU-MIMO, is an example scenario considered herein.

A way to increase the network resources may be to utilize more and more usable spectrum resources, which include not only the licensed spectrum resources of the same type as a macro, but also the licensed spectrum resources of a different type than the macro (e.g., the macro is a FDD cell but a small cell may use both FDD and TDD carriers), as well as unlicensed spectrum resources and shared-licensed spectrums; and some of the spectrum resources may lie in high-frequency bands, such as 6 GHz to 60 GHz. The unlicensed spectrums may be used by generally any users, subject to regulation requirements. The shared-licensed spectrums may also not be exclusive for an operator to use. Traditionally, the unlicensed spectrums are not used by cellular networks as it is generally difficult to ensure quality of service (QoS) requirements. Operating on the unlicensed spectrums mainly includes wireless local area networks (WLAN), e.g. the Wi-Fi networks. Due to the fact that the licensed spectrum is generally scarce and expensive, utilizing the unlicensed spectrum by a cellular operator may be considered. Note that on high-frequency bands and unlicensed/shared-licensed bands, TDD is typically used and hence channel reciprocity can be exploited for the communications.

On unlicensed spectrums, there is generally no pre-coordination among multiple nodes operating on the same frequency resources. Thus, a contention-based protocol (CBP) may be used. According to Section 90.7 of Part 90 (paragraph 58) of the United States Federal Communication Commission (FCC), CBP is defined as:

"A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel."

Note that the state of a channel being busy may also be called as the channel being unavailable, channel being not clear, channel being occupied, etc., and the state of a channel being idle may also be called as the channel being available, the channel being clear, channel being not occupied, etc.

One of the most used CBP is the "listen before talk" (LBT) operating procedure in IEEE 802.11 or Wi-Fi (which can be found in, e.g., "Wireless LAN medium access control (MAC) and physical layer (PHY) specifications," IEEE Std 802.11-2007 (Revision of IEEE Std 802.11-1999), which is hereby incorporated herein by reference in its entirety). LBT is also known as the carrier sense multiple access with collision avoidance (CSMA/CA) protocol. According to the CSMA/CA protocol, carrier sensing is performed before any transmission attempt, and a transmission is performed only if a carrier is sensed to be idle, otherwise, if the carrier is busy, a random backoff time for the next sensing is applied. The carrier sensing is generally done through a CCA procedure to determine if the in-channel power is below a given threshold.

ETSI EN 301 893 V1.7.1 (which is hereby incorporated herein by reference in its entirety), Clause 4. 9.2, describes two (2) types of Adaptive equipment: Frame Based Equipment and Load Based Equipment, where the following is specified (quoted from ETSI EN 301 893 V1.7.1, Clause 4.9.2).

"Frame Based Equipment shall comply with the following requirements:

1) Before starting transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the Operating Channel(s) to be clear, it may transmit immediately (see point 3 below).

2) If the equipment finds an Operating Channel occupied, it shall not transmit on that channel during the next Fixed Frame Period.

NOTE 1: The equipment is allowed to continue Short Control Signaling Transmissions on this channel providing it complies with the requirements in clause 4. 9.2.3.

NOTE 2: For equipment having simultaneous transmissions on multiple (adjacent or non-adjacent) Operating Channels, the equipment is allowed to continue transmissions on other Operating Channels providing the CCA check did not detect any signals on those channels.

3) The total time during which an equipment has transmissions on a given channel without re-evaluating the availability of that channel, is defined as the Channel Occupancy Time. The Channel Occupancy Time shall be in the range 1 ms to 10 ms and the minimum Idle Period shall be at least 5% of the Channel Occupancy Time used by the equipment for the current Fixed Frame Period, with a minimum of 100 μs. Towards the end of the Idle Period, the equipment shall perform a new CCA as described in point 1 above.

4) The equipment, upon correct reception of a packet which was intended for this equipment, can skip CCA and immediately (see note 3) proceed with the transmission of management and control frames (e.g. ACK and Block ACK frames). A consecutive sequence of such transmissions by the equipment, without it performing a new CCA, shall not exceed the Maximum Channel Occupancy Time as defined in point 3 above.

NOTE 3: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.)."

"Load based Equipment may implement an LBT based spectrum sharing mechanism based on the Clear Channel Assessment (CCA) mode using "energy detect", as described in IEEE 802.11™-2007 [9], clauses 9 and 17, in IEEE 802.11n™-2009 [10], clauses 9, 11 and 20 providing they comply with the conformance requirements referred to in clause 4.9.3 (see note 1) (all of which are hereby incorporated herein by reference).

NOTE 1: It is intended also to allow a mechanism based on the Clear Channel Assessment (CCA) mode using "energy detect" as described in IEEE 802.11ac™ [i.2], clauses 8, 9, 10 and 22 (which are hereby incorporated herein by reference), when this becomes available.

Load Based Equipment not using any of the mechanisms referenced above shall comply with the following minimum set of requirements:

1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit.

NOTE 2: The equipment is allowed to continue Short Control Signaling Transmissions on this channel providing it complies with the requirements in clause 4.9.2.3.

NOTE 3: For equipment having simultaneous transmissions on multiple (adjacent or non-adjacent) operating channels, the equipment is allowed to continue transmissions on other Operating Channels providing the CCA check did not detect any signals on those channels.

3) The total time that an equipment makes use of an Operating Channel is the Maximum Channel Occupancy Time which shall be less than $(13/32) \times q$ ms, with q as defined in point 2 above, after which the device shall perform the Extended CCA described in point 2 above.

4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 4: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.)."

The above is quoted from ETSI EN 301 893 V1.7.1, Clause 4.9.2.

Figure 3A:
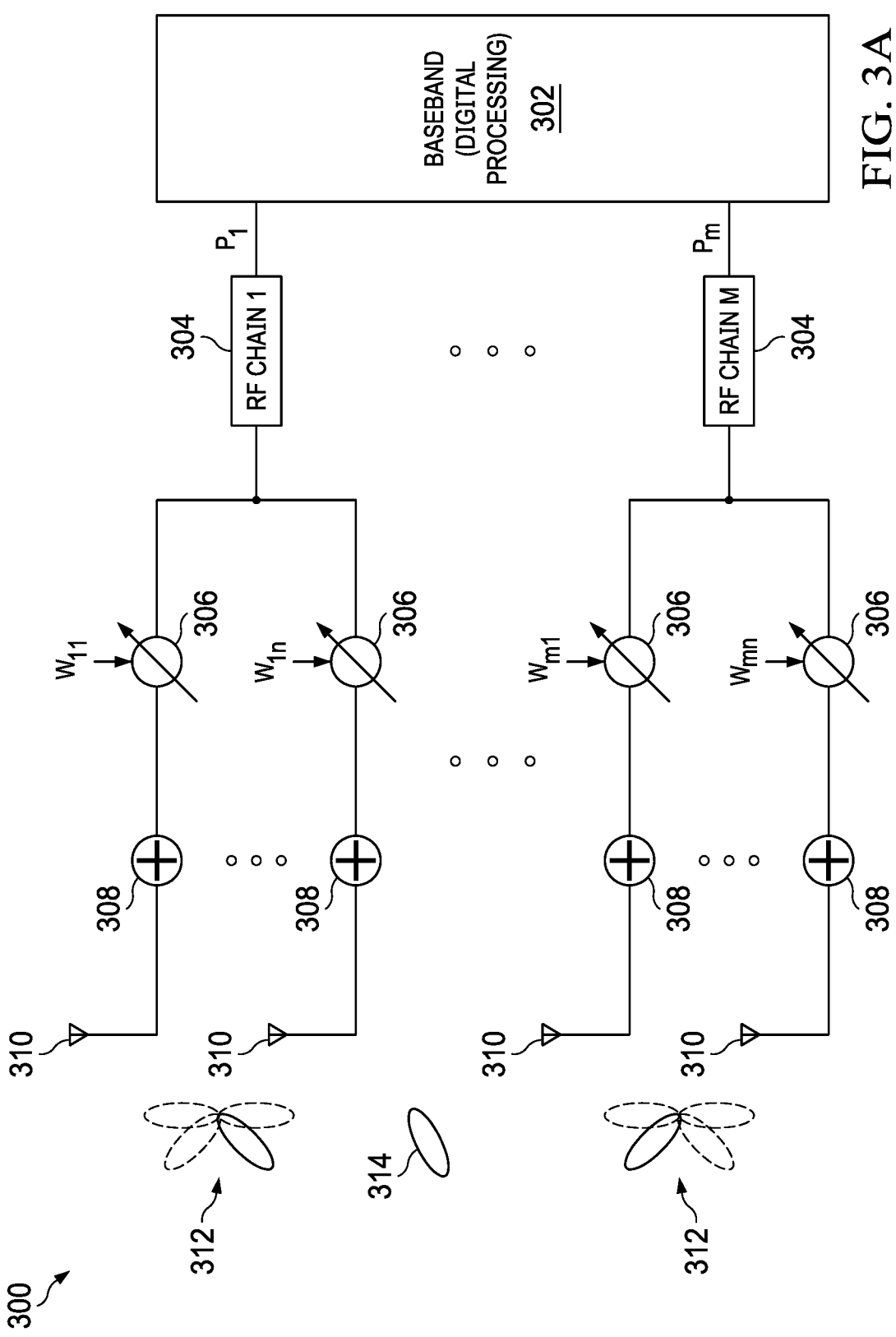
FIGS. 3A and 3B are diagrams of example conventional systems for analog beamsteering and digital beamforming.
Figure 3B:
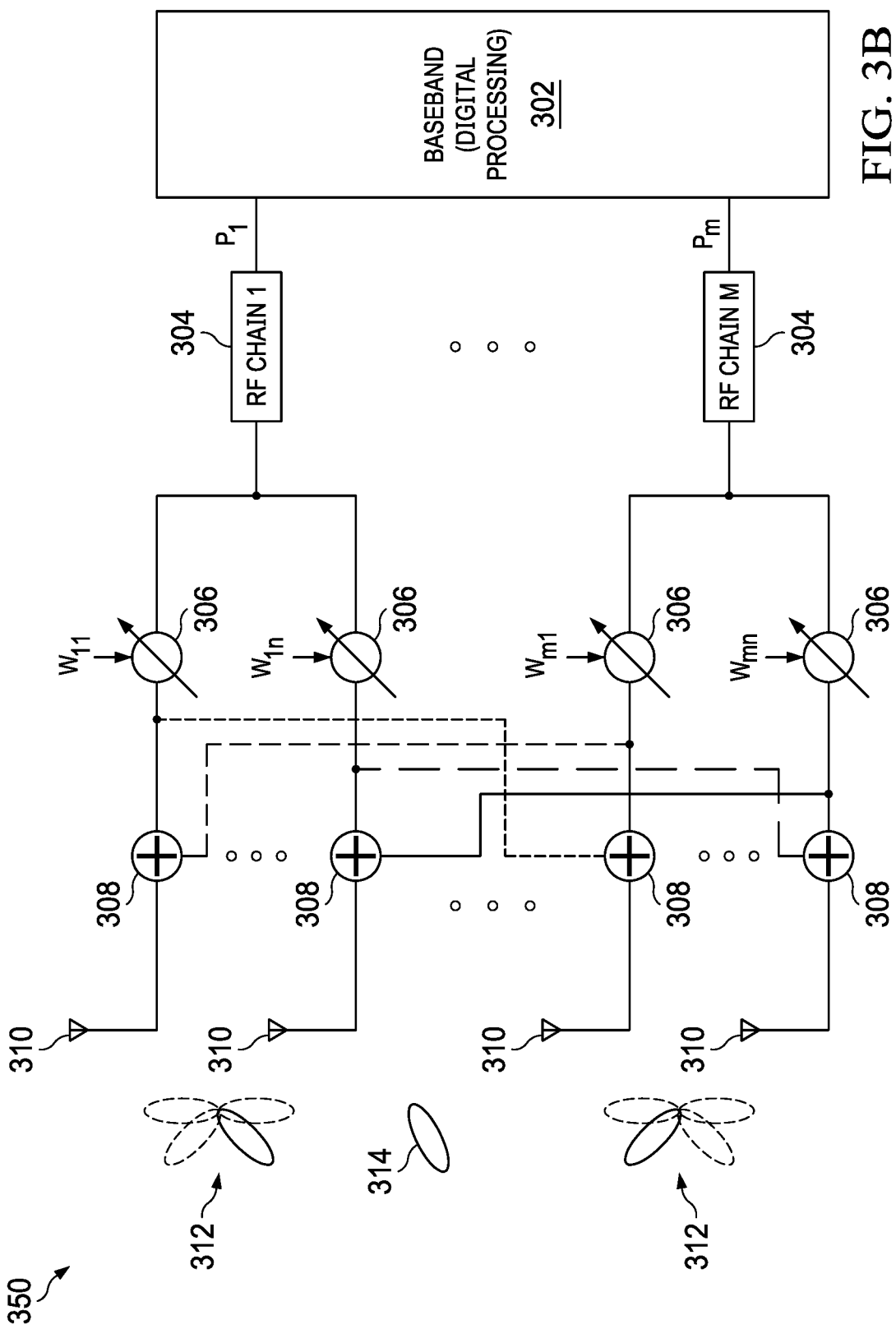

FIGS. 3A and 3B are block diagrams of conventional systems 300 and 350 for analog beamsteering and digital beamforming. System 300 in FIG. 3A includes a baseband component 302 for digital processing, a plurality of RF chain components 304, a plurality of phase shifters 306, a plurality of combiners 308, and a plurality of antennas 310. The system 300 may be used for transmission or receiving. For simplicity, FIG. 3A is illustrated for the case of transmission as an example; the case of receiving may be understood similarly. Each RF chain 304 receives a weighting factor (or weight, $p_1, \ldots, p_m$ as shown in FIG. 3A) from the baseband component 302. The collection of the weighting factors form a digital precoding vector, precoding matrix, beamforming vector, or beamforming matrix for the transmission. For example, a precoding vector may be $[p_1, \ldots, p_m]$. When multiple layers/streams are transmitted, a precoding matrix may be used by the baseband component 302 to generate the weighting factors, with each column (or row) of the matrix applied to a layer/stream of the transmission. Each RF chain 304 is coupled to a plurality of phase shifters 306. The phase shifters 306 may, theoretically, apply any phase shift values, but generally in practice, only a few possible phase shift values, e.g., 16 or 32 values. Each RF chain 304 generates a narrow beam 312 oriented in a direction determined by the settings on the phase shifters 306 and the combiners 308. If the phase shifters 306 can apply any phase shift values, the beam may point to any direction; but if only a few phase shift values can be used, the beam may be one of a few possibilities (e.g., in FIG. 3A, the narrow beam (in solid line) is selected by setting a specific phase shift value in a RF chain 304, and the beam is among all the possible narrow beams shown as solid line and dotted lines corresponding to all the possible phase shift values). Each RF chain selects such a narrow beam, and all such narrow beams selected by all the RF chains (RF chains 1–N) will be further superposed. How the superposition is done is based on the digital weighting factors. A weighting factor can make a beam from a RF chain stronger or weaker, and therefore, a different set of the factors can generate different superpositions in the spatial domain; in FIG. 3A, a particular beam 314 is illustrated. In other words, by selecting different digital weighting factors, different beams 314 can be generated. Digital operations for beamforming may generally be referred to as (digital) beamforming or precoding, and analog operations for beamforming may generally be referred to as (analog) beamsteering or phase shifting.

System 350 in FIG. 3B is similar to system 300 in FIG. 3A, except that corresponding combiners 308 in each RF chain 304 are connected to one another.

Figure 4:
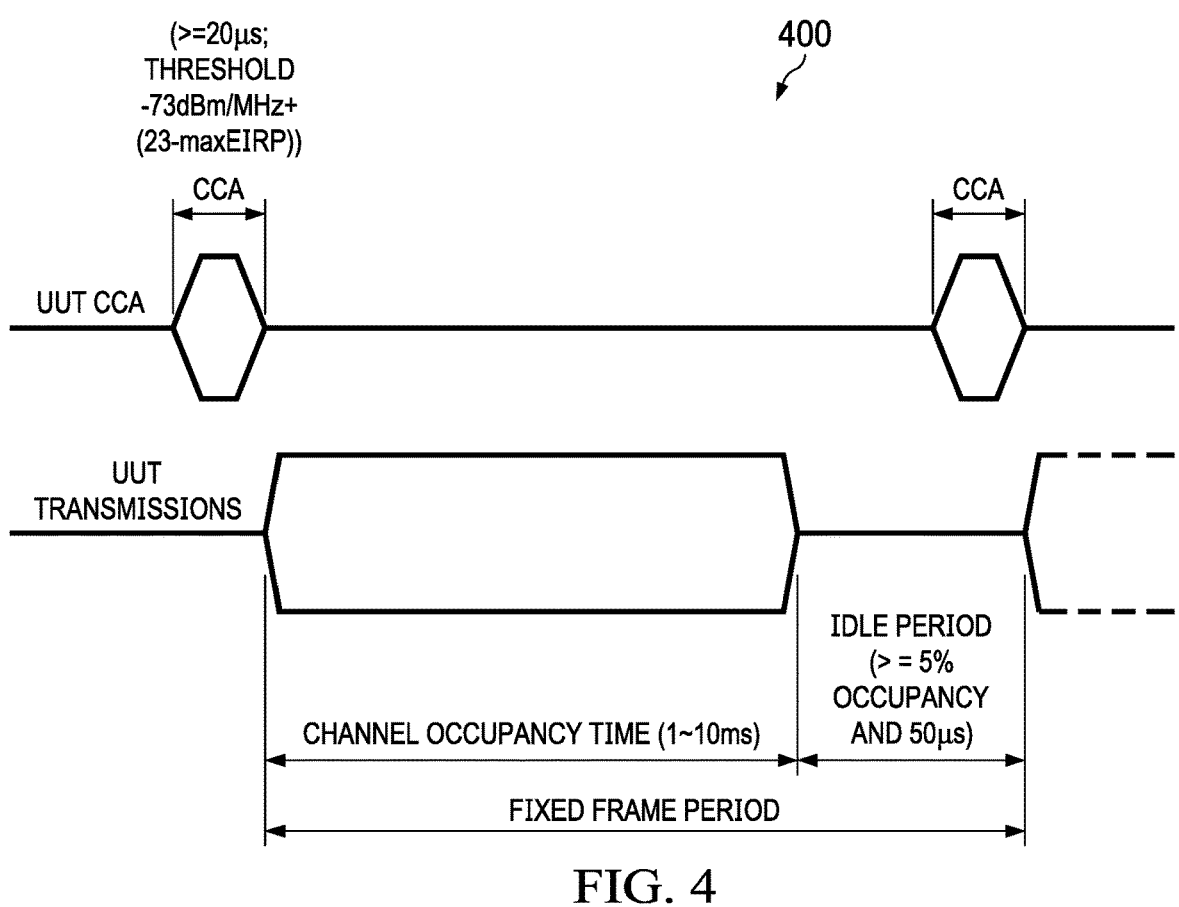
FIG. 4 is a diagram of an example conventional transmission timing of frame based equipment (FBE) operations.

An example conventional timing 400 for transmissions of a frame based equipment is illustrated in FIG. 4. The equipment, e.g., a unit under test (UUT) performs CCA on a channel before transmission, and when the channel is idle (or available, not occupied), the equipment performs transmission during a channel occupancy time, and enters an idle state for an idle period. During the idle period, the equipment performs CCA to determine whether the channel is available.

Figure 5:
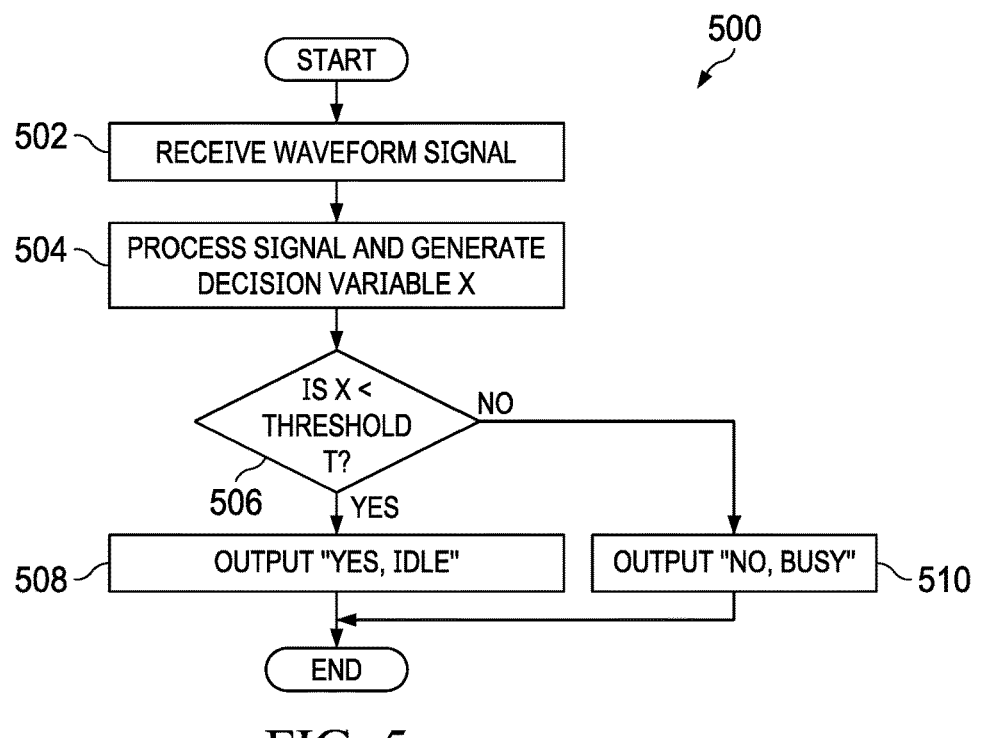
FIG. 5 is a flowchart of a conventional carrier sensing method.

A flowchart of an example conventional method 500 for carrier sensing is illustrated in FIG. 5.

The method 500 of FIG. 5 begins at block 502 where a communication controller receives a waveform signal from a UE. At block 504, the communication controller processes the signal and generates a decision variable, X. The signal processing herein, generally done in the digital domain which is normally performed in baseband, may include sampling, analog to digital (A/D) conversion, receiver's digital combining with precoding weighting, etc. The decision variable, X, is used to determine whether a carrier channel is idle or busy. At block 506, the communication controller determines whether the decision variable is less than a threshold, T. The threshold may be a standardized value or derived from a standard or some regulation, and may be device type specific, spatial specific, etc. The threshold may also be allowed to change within a specified range according to traffic loads, interference conditions, etc. If, at block 506, the communication controller determines that the value of the decision variable, X, is less than the threshold, T, the method 500 proceeds to block 508 where the communication controller determines that the carrier channel is idle, after which, the method 500 ends. If, at block 506, the communication controller determines that the value of the decision variable, X, is not less than the threshold, T, then the method 500 proceeds to block 510 where the communication controller determines that the carrier channel is busy, after which, the method 500 ends.

Figure 6:
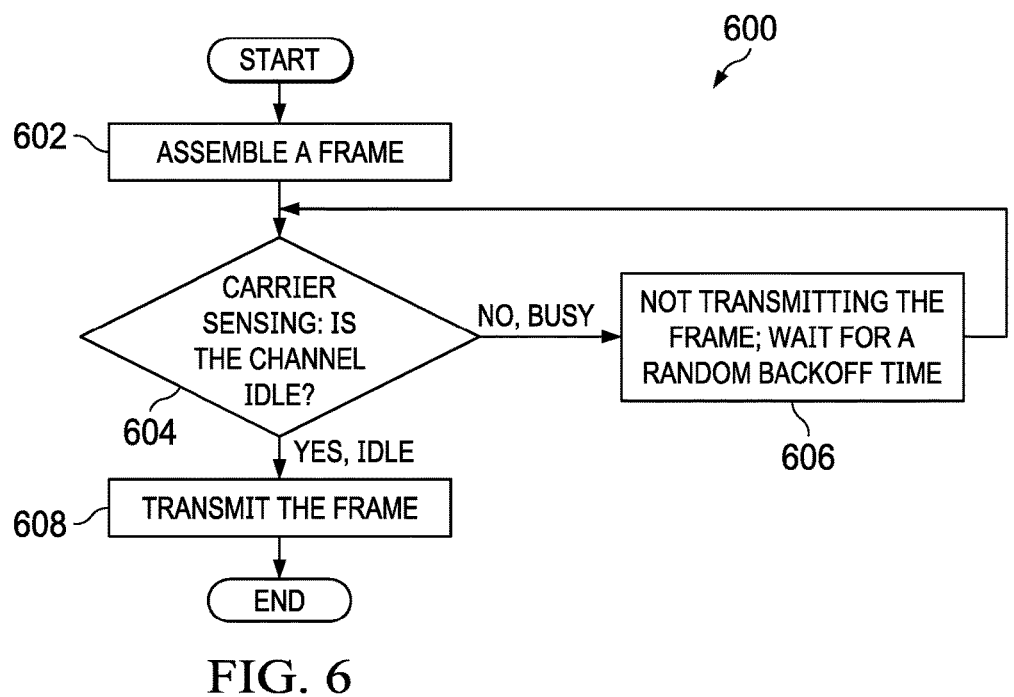
FIG. 6 is a flowchart of a conventional listen-before-talk method.

A flow chart of a conventional listen-before-talk mechanism 600 is illustrated in FIG. 6. The method 600 of FIG. 6 begins at block 602 where a communication controller assembles a frame. At block 604, the communication controller performs carrier sensing, such as the carrier sensing described above with reference to FIG. 5, to determine if a channel is idle. If, at block 604, the communication controller determines that the channel is not idle, but is busy, then the method 600 proceeds to block 606 where the communication controller refrains from transmitting the frame and waits for a random backoff timer to expire, after which, the method 600 returns to block 604. If, at block 604, the communication controller determines that the channel is idle, then the method 600 proceeds to block 608 where the communication controller transmits the frame, after which, the method 600 ends.

Figure 7:
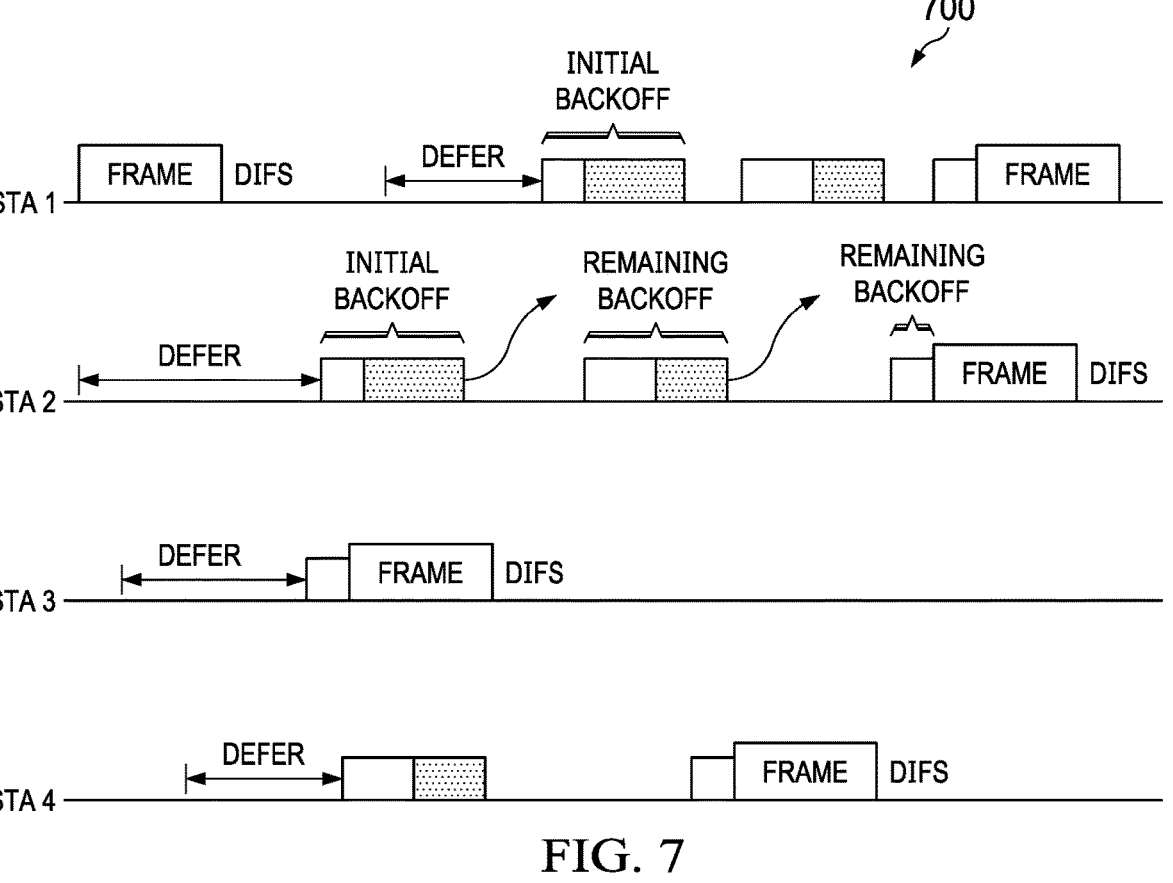
FIG. 7 is a diagram of an example conventional Wi-Fi channel access procedure.

Wi-Fi is an eminent example of applying the listen-before-talk mechanism. Wi-Fi uses 802.11 standards technologies such as the air interface (including physical (PHY) and MAC layer). In 802.11, a communication channel (or referred to as a wireless channel) is shared by stations under a mechanism called distributed channel access with a function called DCF (distributed coordination function), which uses CSMA/CA. The DCF uses both physical and virtual carrier sense functions to determine the state of the medium (i.e., the communication channel). The physical carrier sense resides in the PHY, and uses energy detection and preamble detection with frame length deferral to determine when the medium is busy. The virtual carrier sense resides in the MAC and uses reservation information carried in the Duration field of the MAC headers announcing impeding use of the wireless channel. The virtual carrier sense mechanism is called the network allocation vector (NAV). The wireless channel is determined to be idle only when both the physical and virtual carrier sense mechanisms indicate it to be so. A station (e.g., STA 1) with a data frame for transmission first performs a CCA by sensing the wireless channel for a fixed duration, i.e., the DCF inter-frame space (DIFS). If the wireless channel is busy, the station waits until the channel becomes idle, defers for a DIFS, and then waits for a further random backoff period (by setting a backoff timer with an integer number of slots). The backoff timer decreases by one for every idle slot and freezes when the channel is sensed busy. When the backoff timer reaches zero, the station starts data transmission. The Wi-Fi channel access procedure 700 as described above is shown in FIG. 7.

To meet the regulatory requirements of operating in the unlicensed spectrum and to co-exist with other radio access technologies (RATs) such as Wi-Fi, the transmissions on the unlicensed spectrum cannot be continuous or persistent in time. Rather, on/off, or opportunistic transmissions and measurements on demand may be adopted.

Figure 8A:
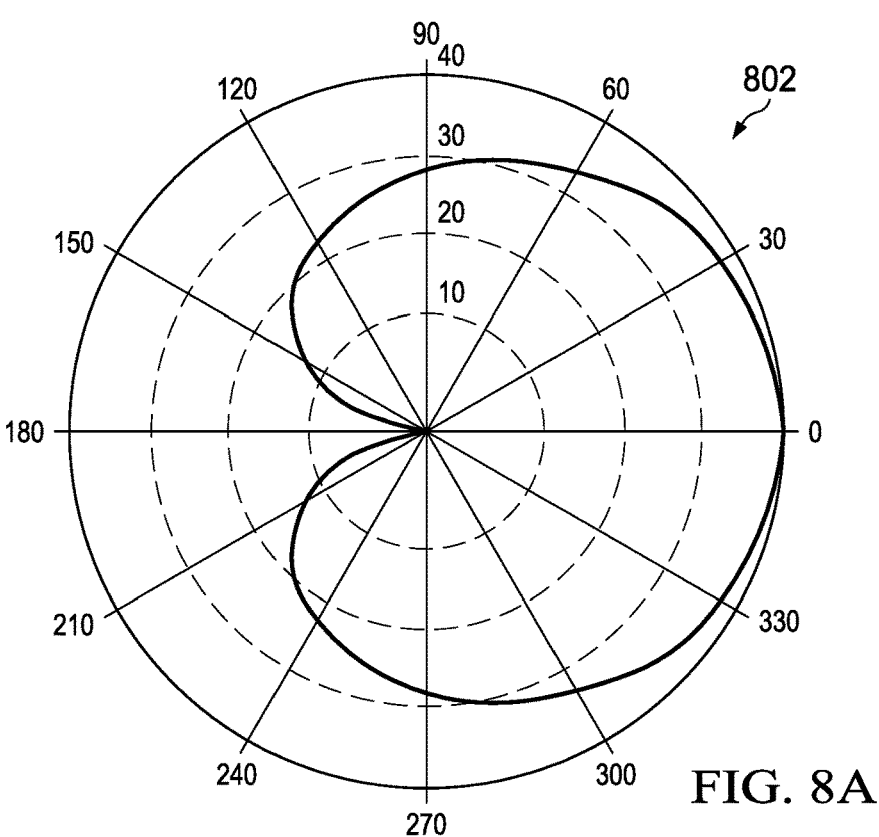
FIG. 8A is a diagram of an example wide beam pattern.
Figure 8B:
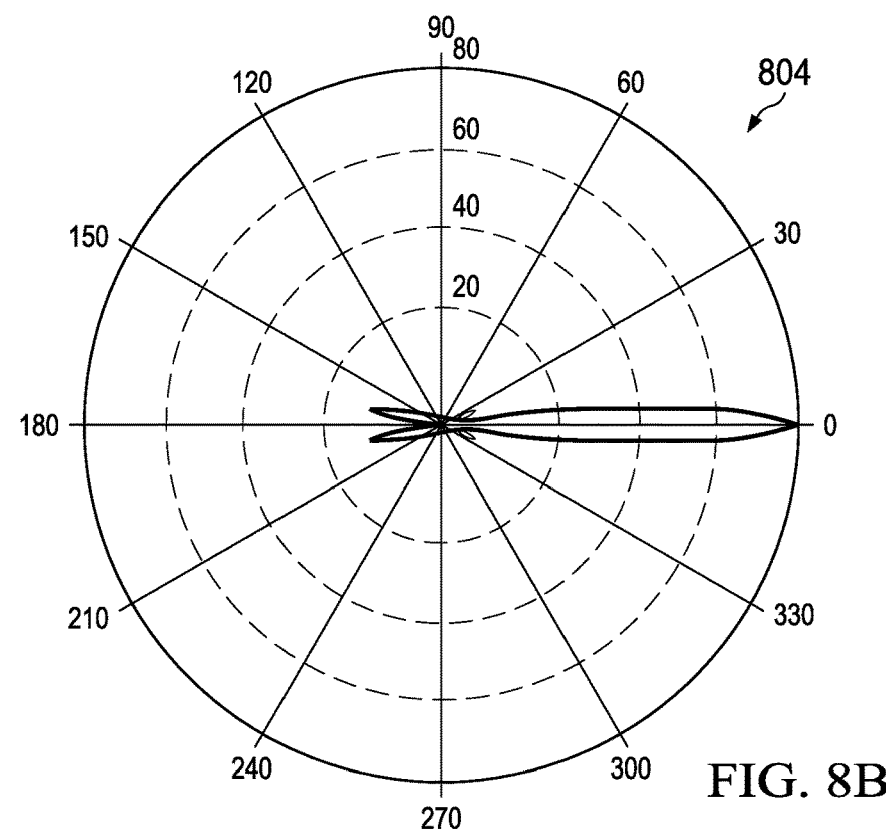
FIG. 8B is a diagram of an example narrow beam pattern.

In addition, for operations in high-frequency bands, especially in the bands from 28 GHz to 60 GHz, which generally belong to the mmWave regime, communications have quite different propagation characteristics from that in the micro-wave frequency bands (generally below 6 GHz). For example, mmWave experiences higher pathloss over distance than microwave does. Therefore, high-frequency bands are more suitable for small cell operations than macro cell operations, and they generally rely on beamforming with a large number of antennas (e.g., >16, and sometimes may be even a few hundred) for effective transmissions. Note that at high frequency, the wavelengths, antenna sizes, and antenna spacing may all be smaller than those at low frequency, thus making it feasible to equip a node with a large number of antennas. As a result, the beams formed by the large number of antennas can be very narrow, for example, with beamwidth of 10 deg or even less. In sharp contrast, in traditional wireless communications, beamwidth is generally much wider, such as in tens of degrees. FIG. 8A illustrates a diagram of a wider beam pattern 802 with a small number of antennas in low frequency. FIG. 8B illustrates a diagram of a narrow beam pattern 804 with a large number of antennas in high frequency. In general, it is regarded that narrow beams are a major new feature of mmWaves. As a general rule of thumb, the beamforming gain by massive MIMO can be roughly estimated by N×K, where N is the number of transmit antennas and K is the number of receive antennas. This is because the 2-norm of the channel matrix H scales roughly according to $(N \times K)^{1/2}$, and therefore if the precoding vector by a transmitting node is p, and the combining vector by a receiving node is w, then the composite channel is w'Hp, and by properly selecting w and p, the composite channel gain in energy can attain N×K, which is much higher than the case with fewer antennas.

In the unlicensed spectrum, the interference cannot be predicted. In high frequency bands, such as 60 GHz, directional communication is preferred in order to mitigate the effects of high pathloss. When using directional communication, there are specific problems to consider, which are exacerbated in communication using unlicensed high frequencies. Some of these problems are discussed in the following as examples.

Figure 9:
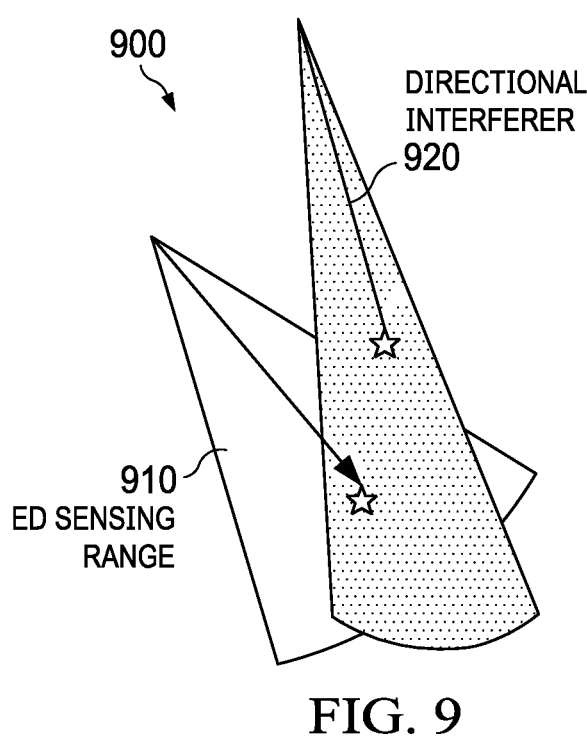
FIG. 9 is a diagram showing an example of deafness problem in directional communications.

Directional LBT, i.e., sensing, with a directional beam pattern, a channel before transmitting (for instance, using energy detection (ED)) may miss ongoing directional transmissions, and this is referred to as the so called deafness problem. The deafness is a problem because a gNB, after a successful LBT, may transmit to a UE, while another transmission is going on around the UE as a receiver. Deafness is an example of a hidden node problem. FIG. 9 is a diagram illustrating an example of the deafness problem. In this example, a gNB may perform directional LBT on a channel in an ED sensing range 910 for communication with a UE. Another gNB (referred to as a directional interferer to the gNB) may be performing a directional transmission to the UE in a spatial range 920 on the same channel. However, unless the directional LBT of the gNB is oriented towards the directional transmission of the directional interferer, the channel may be sensed as idle by the gNB. The gNB senses that the channel is idle and transmits to the UE. However, for the UE, the channel is instead busy because another gNB is transmitting to the UE, and thus the UE may fail to receive a transmission from the gNB. This is caused by the gNB's deafness of the transmission from the directional interferer.

Interference at a receiver is stronger and more directional (flash interference) when using a directional antenna than when using an omni pattern antenna, and therefore, it is harder to mitigate the interference via coding or lower modulations. In such a strong interference situation, it is preferable to avoid the interference, e.g., avoiding transmission.

Just simple immediate retransmission would not necessarily solve the problem of this type of strong interference because the interference may persist for some time, for instance, from sources of interference that do not respect any protocol, or from a transmission that has just started.

RTS/CTS (Request To Send/Clear To Send) is a mechanism used by 802.11 wireless communication protocols to reduce collisions caused by the hidden node problem. In addition to CCA performed at a transmitter, a receiver is also involved to sense the channel availability before occupying the channel for data transmission.

In cellular networks, a network controller (e.g., a gNB, TRP, etc.) typically serves a number of UEs within its coverage. After the network controller occupies a shared spectrum channel after a successful CCA, it may transmit channels/signals to multiple UEs instead of a single UE. Obtaining certain feedback(s) from the UEs it serves can help the network controller make better decision on subsequent data transmissions by, e.g., avoiding transmitting to heavily interfered UEs, using proper modulation and coding scheme (MCS) levels for UEs with relatively low signal to interference noise ratios (SINRs) due to interference, or selectively using a shared spectrum channel with a better interference situation. This may be referred to as receiver-assisted channel access in cellular networks.

To enable this kind of receiver-assisted channel access in cellular networks, the following designs may be needed:

A measurement to be specified and performed at receivers (or UEs) including, e.g., a measurement quantity, resources over which the measurement is performed, a quantization criterion, etc.

A triggering mechanism for the network controller to request the UEs to perform the measurement and send back report(s).

A reporting mechanism for the UEs to send back the measurement(s) to the network controller, including at least control channel resources for sending reports, e.g., a channel state information (CSI) report.

The network controller takes the reports from the UEs into account for data channel (and signal) transmissions. This may be specified or left for network implementation.

NR Interference Measurement

A NR solution for interference measurements exists, as specified in TS 38.214 (5.1.4.2). There are two types of resources that can be used to measure interference in NR:

Non-zero power (NZP) channel state information reference signal (CSI-RS) resource used for channel state information measurement and for calculating the residual interference.

Channel state information interference measurement (CSI-IM) resource—including zero power resource elements (REs) configured by the network, where the interference can be directly measured by a UE.

In addition to the NZP CSI-RS and CSI-IM resources, the standards define zero power (ZP) CSI-RS resources as a set of resource elements where physical downlink shared channel (PDSCH) is not mapped. However, a UE cannot make any assumptions of the content of these resources. For instance, other signals (except PDCCH) may be transmitted in those resources from the same gNB, which signals are used mainly for rate matching.

Figure 10:
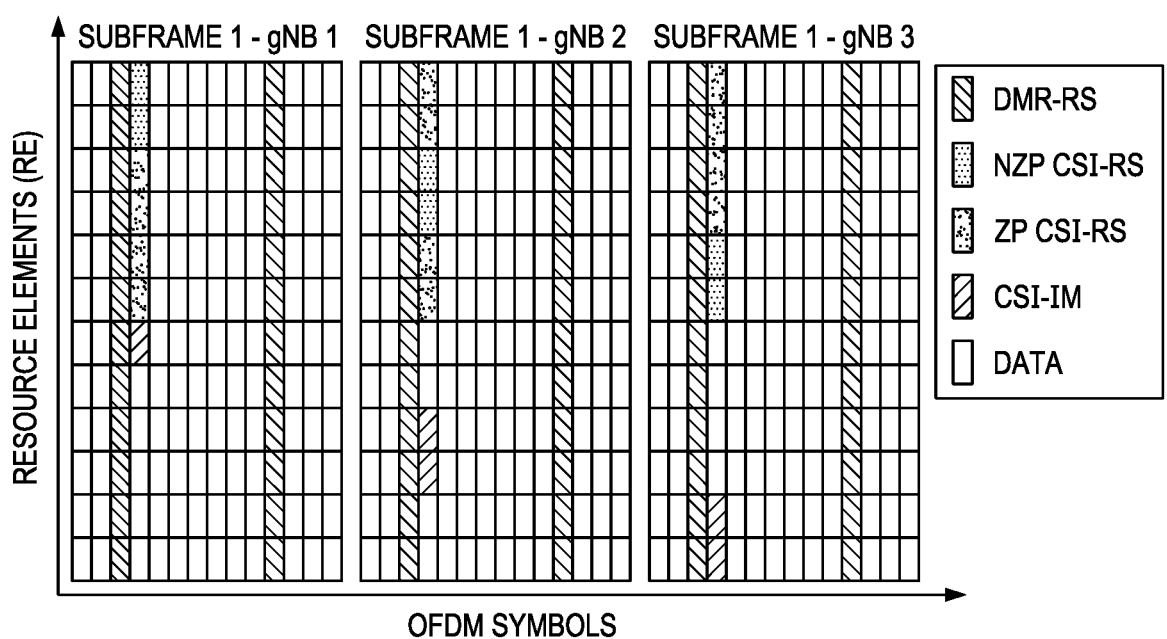
FIG. 10 is a diagram showing example resources allocated by multiple gNBs.

In the same network, the NZP CSI-RS resources may be protected against inter-cell intra-network interference by allocating either CSI-IM or ZP CSI-RS resources overlapping NZP CSI-RS resources from other cells. Transmission in the NZP CSI-RS resources may experience less inter-cell intra-network interference. An example of resource allocations among interfering base stations (gNBs) for interference measurements is provided in FIG. 10 for explanation purposes. FIG. 10 is a diagram showing example resources allocated by gNB 1, gNB2 and gNB3, respectively, including demodulation-reference signal (DM-RS, or DMRS) resources, NZP CSI-RS resources, ZP CSI-RS resources, CSI-IM resources, and resources for data transmission. gNB 1, gNB2 and gNB3 are interfering base stations to one another. As shown, ZP CSI-RS resources allocated by each of the gNB 1, gNB2 and gNB3 overlap NZP CSI-RS resources of the other two. For example, ZP CSI-RS resources of gNB1 overlap NZP CSI-RS resources of gNB2 and gNB3. Similarly, ZP CSI-RS resources of gNB2 overlap NZP CSI-RS resources of gNB3 and gNB1, and ZP CSI-RS resources of gNB3 overlap NZP CSI-RS resources of gNB2 and gNB1. In this way, NZP CSI-RS resources of each of the gNB 1, gNB2 and gNB3 is protected from interferences of the other two base stations.

It is observed that NZP CSI-RS resource allocations are protected via ZP CSI-RS resource allocation in neighboring gNBs, and CSI-IM is not protected and can be used to measure directly the precoded interference from the neighboring cells. In the example of FIG. 10, UEs may use NZP CSI-RS resource allocations to estimate channels between the UEs and a gNB if the NZP CSI-RS resource allocations are configured as channel measurement resources (CMRs), or to estimate interferences from another gNB/TRP if the NZP CSI-RS resource allocations are configured as interference measurement resources (IMRs). NZP CSI-RS resources may also be used to measure non-precoded interferences after a UE has estimated and removed a transmitted NZP CSI-RS signal. Note that a ZP CSI-RS resource allocation does not guarantee against other transmissions (e.g., broadcast signals), which are non-precoded. In the example of FIG. 10, CSI-IM resources of a gNB may collide with DL data transmissions (PDSCH) from other gNBs, which are supposed to be pre-coded.

The resources for a NZP CSI-RS, a ZP CSI-RS and a CSI-IM, respectively, may be configured from upper layers. Based on time allocation (i.e., the type of resource allocation, such as aperiodic, semi-persistent and periodic allocations), a UE may be configured with one or more resource set configuration(s) for aperiodic, semi-persistent and periodic time-domain behaviors for each of NZP CSI-RS, ZP CSI-RS and CSI-IM. A NZP CSI-RS upper layer configuration includes a reference to a transmission configuration indicator (TCI)-state indicating quasi co-location (QCL) source RS(s) and QCL type(s). The RS can be a SS/PBCH block, a TRS (tracking reference signal, which is a CSI-RS resource set configured with "trs_info" for time and frequency fine tracking), or a CSI-RS located in the same component carrier (CC)/DL BWP or different CCs/BWPs.

In time domain allocation, a TRS can have two CSI-RS resources in a slot or four CSI-RS resources in consecutive slots. The bandwidth of the CSI-RS resources is given by the higher layer parameter freqBand and is a minimum of 48 resource blocks (RBs) for the unlicensed spectrum (5 GHz). If both NZP CSI-RS and CS-IM are configured for one CSI report, the NZP CSI-RS and the CS-IM are QCLed with respect to "QCL-TypeD", as specified in TS 38.214, Vi6.5.0.

The CSI reporting is configured by an upper layer configuration parameter "CSI-ReportConfig" and can be, based on time behavior, "aperiodic", "semiPersistentOnPUCCH", "semiPersistentOnPUSCH", or "periodic". The report configuration parameter "reportFreqConfiguration" indicates the reporting granularity in the frequency domain and the parameter "timeRestrictionForInterferenceMeasurements" can be configured to enable a time domain restriction for interference measurements.

When two resource settings are configured, with one for channel measurement (e.g., a SSB, or a CSI-RS) and one for interference measurement (e.g., CSI-IM or NZP CSI-RS), the number of SSB(s) or CSI-RS resources for channel measurement equals to the number of CSI-IM resources or the number of NZP CSI-RS resource for interference measurements.

There are two patterns defined for CSI-IM resources elements per PRB.

It is noted that the 3GPP specifications do not define any reporting based on ZP CSI-RS. The ZP CSI-RS is part of a PDSCH configuration (downlink control information (DCI)

Format 1_1, 1_2), and UEs are signaled to not expect PDSCH transmissions on those ZP CSI-RS resources (time and frequency).

The CSI report defined in the 3GPP specifications may include the following indicators: Rank Indicator (RI), Layer Indicator (LI), Channel Quality Indicator (CQI)—4 bits, RS Received Power (RSRP)—7 bits, SINR—7 bits, Precoder Matrix Indicator (PMI), CSI Resource Indicator (CRI), and SSB Indicator.

3GPP TS 38.215 defines the received signal strength indicator (RSSI) based on the linear average of the total received power (in Watts (W)) observed only per configured OFDM symbol, and the bandwidth used in the RSSI measurement corresponds to the channel bandwidth.

Cross link interference (CLI) received signal strength indicator (CLI-RSSI) is defined based on the linear average of the total received power (in W) observed only in configured OFDM symbols of configured measurement time resource(s) and in a configured measurement bandwidth. The CLI-RSSI measurement is not defined for shared spectrum as it requires time advance compensation.

The existing NR solutions for interference measurements as described above are not adequate for receiver-assisted transmissions in a shared spectrum. In the shared (unlicensed) spectrum, multiple RATs need to coexist in an uncoordinated environment. The only protection available for a transmission or multiple transmissions is the LBT procedure as presented in above. That is, in the scenario of communications in the shared spectrum may consider situations, there may be multiple RATs coexisting and channel access in the shared spectrum is performed in an uncoordinated way. The LBT procedure may be needed in order to reduce interferences and provide fairness for channel access. A receiver-assisted solution applicable for communications in the unlicensed spectrum may need to consider specific requirements.

The following lists some requirements for a receiver-assisted solution in unlicensed bands, including:

a. A transmitter needs to trigger the LBT procedure before transmitting to a receiver.

b. The receiver needs to inform the transmitter about assessment of a channel or resources for reception from the transmitter (e.g., available/not available or interfered/not interfered, for example). The receiver needs to perform the assessment of the channel or resources before the transmission takes place.

c. The assessment of the channel/resources needs to be simple, robust and fast, for example, a simple energy detection may be used.

d. The receiver may need to estimate the energy only in the channel or resources (or a subset of them) that are dedicated for the next transmission to the receiver.

In some embodiments, for measurement for receiver-assisted channel access (i.e., assessing a channel or resource) in the unlicensed spectrum, a measurement and report of interference levels over CSI-IM resource(s) may be used. The measurement over the CSI-IM resource(s) has low complexity for measurement without the need to perform channel estimation or sequence detection. As an example, to meet the above listed requirements, a receiver may assess a channel in the unlicensed spectrum by performing a measurement (e.g., energy detection) on a CSI-IM resource of the channel, and report the measurement result to a transmitter as assistance information for the transmitter to use in transmission to the receiver. The measurement on the CSI-IM resource is relatively less complex since no channel estimation or sequence detection is needed.

The following are a few embodiment designs proposed for receiver-assisted channel access in the unlicensed spectrum:

Unlike for the existing CSI report, where a CSI-IM resource must be paired together with a NZP CSI-RS or SSB resource for channel measurement, no channel measurement resource is needed for assessing a channel or resource in the unlicensed spectrum. Therefore, only a single resource setting for interference measurement may be configured for a CSI report. A CSI-IM resource is used for the interference measurement.

Each CSI-IM resource setting in a DL BWP may be identified by the higher layer parameter BWP-id, and all CSI resource settings linked to a CSI report setting may have the same DL BWP. Therefore, the CSI resource settings are limited to a single BWP. A CSI resource setting configures one or more CSI-IM resources. It is common for shared spectrum access that a gNB tries to access multiple shared spectrum channels at the same time. When a CCA succeeds over a number of shared spectrum channels, the gNB may transmit simultaneously over these channels. The gNB can use a wideband carrier to occupy a number of contiguous shared spectrum channels, where a BWP can be configured in the wideband carrier such that CSI-IM resources are all of this BWP. The gNB can also use carrier aggregation with one carrier for each of the shared spectrum channels, and hence multiple BWPs are needed for these carriers and the measurement resources will belong to different BWPs.

Receivers, such as UEs, may be triggered to measure and report measurements over several CSI-IM resources for different BWPs/carriers.

A transmitter (e.g., a gNB) may be configured to request channel assessment from multiple receivers (e.g., UEs) simultaneously, which thus reduces the signaling overhead. In addition, the UEs can use the same CSI-IM resource to measure the interference.

As directional (beamformed) transmission is used in high frequencies, the channel assessment at each receiver needs to use the same receiving beam (or spatial filter) intended for subsequent data transmissions in order to accurately reflect the actual interference situation of each UE. Information about one or more receiving beams (or spatial filters) may be indicated to a receiver (e.g., a UE) via a TCI a for interference measurement. The TCI may include the QCL type-D information of the receiving beams. The QCL type-D information may also be indicated separately from the TCI.

Interference measurement or energy detection measurement needs to be defined over CSI-IM resource(s). Note that interference measurement or energy detection may also be performed over a time gap when both the transmitter and receiver (e.g., the gNB and the UE) do not transmit.

Embodiments of the present disclosure provide a method for receiver-assisted channel access in an unlicensed spectrum. In some embodiments, a base station that intends to transmit to a UE in the unlicensed spectrum may request or trigger the UE to perform a measurement for reception on a resource in the unlicensed spectrum. The UE performs the measurement to determine whether the resource is busy (also referred to as the resource is occupied, not clear or unavailable) or idle (also referred to as the resource is not occupied, clear or available) for reception of transmissions from the base station. The UE may perform the measurement on the resource by detecting energy on the resource, and determine whether the resource is busy based on the detected energy and a threshold. For example, the UE may perform a CCA to determine availability of the resource for reception. Thus, the UE performing the measurement on the resource may be viewed as sensing the resource. The UE may send a measurement report to the base station, which is referred to as receiver-assistance information. The receiver-assistance information may be used by the base station to determine whether to transmit to the UE in the resource. The base station may determine to transmit a transmission to the UE in the resource when the resource is idle based on the receiver-assistance information, and may defer the transmission to the UE in the resource when the channel is busy based on the receiver-assistance information. When the resource measured by the UE is busy, this may indicate that there is a transmission to the UE in the resource, and this transmission would cause interference to the base station's transmission to the UE. Thus, measuring the resource to determine whether the resource is busy may be viewed as measuring interference in the resource from an existing transmission to an intended transmission. The measurement performed by the UE may thus be referred to as an interference measurement (IM). The base station may configure the resource on which the interference measurement is performed. The resource may be referred to as an IM resource (IMR) or CSI resource. The resource may include one or more resource sets or one or more carriers. A resource set may include one or more resources or resource elements. The IM may be performed per resource in a resource set, per resource set, or per carrier. The resource may include a time resource, a frequency resource, a spatial resource, or a combination thereof. As an example, the IM resources may be CSI-IM resources as discussed above. The report by the UE may be defined as a new type of CSI report, and the measurement may also be referred to as a new CSI measurement. The new CSI measurement may only include interference measurement on one or more IMRs, and the new CSI report may only include measurement results of the one or more IMRs. The new CSI report will also be referred to as a "CSI report" for simplicity in the following description. The CSI report may map a measurement per resource in a resource set, or per sub-set of resources in the resource set, or per carrier, which is based on configurations.

As used herein, "measuring a resource" may be referred to as "sensing the resource", "performing an interference measurement on the resource", "detecting energy on the resource", or "performing a CSI measurement on the resource", unless otherwise provided. As used herein, a report made by the UE on the measurement may be referred to as a "measurement report", a "CSI report", an "interference measurement report", a "sensing report", or an "interference measurement indicator (IMI) report". As also used herein, the terms of "unlicensed spectrum" and "shared spectrum" are used interchangeably.

The embodiments may be applied to communications in the unlicensed spectrum between a base station and a UE, and between UEs. As an example, a base station may have downlink data available for a UE, and trigger or request the UE to measure a resource for reception. As another example, a UE may have uplink data available for a base station, and the base station may be configured to measure a resource for reception. In this case, the base station may not need to be requested or triggered by the UE to measure the resource when an uplink transmission scheduling is known to the base station. As yet another example, a first UE may have data available for a second UE, e.g., in a device to device (D2D) communication, and trigger or request the second UE to measure a resource for reception of the data. The embodiments in the following are described using a scenario where a base station requests a UE to perform an interference measurement for merely illustrative purposes. Those of ordinary skill in the art would recognize that many variations, modifications, alternations would apply without departing from the spirit and principle of the present disclosure.

According to some embodiments, methods, apparatus, and signaling between a base station and a UE are provided, where the base station requests the UE to sense the received energy/interference on specific resources of an unlicensed spectrum and report back to the base station. Information reported by the UE may be used for future transmissions to the UE. As an example, a gNB may send a request (e.g., via DCI) to a UE or a group of UEs, requesting the UE or the group of UEs to measure the received energy on specified/configured resources, to compare the received energy with a threshold, and to provide timely feedback of the measurement prior to a data transmission from the gNB to the UE. A UE does not expect to receive a transmission on resources it sensed as busy based on the detected energy on those resources. As discussed above, a specified/configured resource may include one or more carriers, or one or more resource sets. The UE may be configured to detect received energy on an entire bandwidth of a carrier, a subset bandwidth of the carrier, a specific time resource, frequency resource, spatial resource, etc.

The relationship between energy and power is well known, where the power is measured as the energy over time unit. Therefore, in this disclosure, both terms of "power" and "energy" will be used with the above understanding. An energy threshold is typically defined for a fixed amount of time, and therefore is equivalent to a specific power. In addition, interference measurement and report can be done in terms of power measurement over an associated resource or in terms of energy detection over an associated resource. Therefore, in this disclosure, the terms of "interference measurement and report", "power measurement and report", and "energy detection and report" are used interchangeably with the understanding that one can be derived from the other with a scale.

In one embodiment, new received energy measures (e.g., a CSI-RSSI as defined in 38.215 and based on CSI-IM configurations, and a CC-RSSI, as defined in the disclosure) are provided.

In one embodiment, a new DCI format (or one or more fields in an existing DCI format) is provided. The new DCI format may be used to inform a UE to measure the interference on a set of resources (e.g., resources of intra-carrier or cross-carriers) and to report measurement results back to a gNB via an interference measurement indicator (IMI) map, which shows the available resources (i.e., which resources are available). The IMI map may indicate an interference status of each resource that is measured. The interference status may indicate that a resource is available or unavailable, or the resource has interference or does not have interference, etc. The interference status of a resource may be determined by the UE based on measured energy on the resource and a threshold. For example, if the measured energy is greater than the threshold, the resource may be determined clear, and if measured energy is not greater than the threshold, the resource may be determined busy. An IMI map may also be configured to indicate detected energy on each resource. In this case, the gNB receiving the IMI map may determine an interference status of a resource based on the detected energy on the resource and a threshold.

In one embodiment, a new DCI format to inform a group of UEs to start an interference measurement is provided, where the group of UEs may be identified via a group radio network temporary identifier (RNTI) used to scramble DCI cyclic redundancy check (CRC).

In one embodiment, techniques to report the interference measurement results (e.g., aperiodic, periodic or semi-static) with a configurable number of bits used to quantize the measurement results are provided.

In some embodiments, extension and enhancement of the current CSI feedback mechanism is proposed to allow a group of UEs (where a UE-specific, group-based, or broadcast triggering may be used) to measure and report their interference conditions/statuses (or energy sensing results) back to a gNB. The gNB takes these reports from the group of UEs into account for further data transmission per implementation as in the conventional case of CSI feedback. gNB behavior may be defined in specifications of a standard. Further, instead of introducing RTS/CTS (or transmit request (TR) and transmit accept (TA)/transmit delay (TD)), a fast report of energy detection (e.g., a new type of CSI as UE (receiver) assistance information) is defined.

For faster report, shorter processing time is needed, specifically for reporting the embodiment new CSI measurements (or IMs). Defining a simpler measurement and report will help shorten the processing time. If a UE only needs to perform energy detection (without processing a RS via, for example, channel estimation or sequence detection), the measurement should be fast at least for some steps. Note that if only a UE CSI report is defined as receiver assistance information, it may not be too critical to be very fast.

Embodiments provided in the disclosure further include the following aspects:

Transmit a CSI request/trigger in a DCI. A CSI request in a DCI is already supported conventionally. The CSI request may be a state of a codeword of a request field and there is no need to introduce a new field. A group DCI to trigger a group of UEs may be used, and one motivation is that a gNB may need to trigger a number of UEs at the same time using the same measurement resource (e.g., an IMR, or a CSI-IM resource) and report the same type of CSI, etc. Within the group DCI, for each UE, indication or configuration may be needed for a PUCCH resource, spatial QCL, etc.

Define a new measurement and CSI report, for example, for energy detection or interference measurement. Granularity for report in quantization and frequency resource unit is to be defined.

A UE sends a CSI report on an indicated/configured PUCCH resource. The CSI report may also be piggy-backed on a data transmission, such as on a PUSCH.

In addition to energy detection over an IMR or CSI-IM resource, a UE may perform a CCA-like procedure over several energy detection or sensing resources to derive the report quantity.

Possible gNB behavior may be specified after receiving one or more CSI reports.

Measurement

In some embodiments, two types of measurements that a UE may be requested to perform may be provided.

A first type of measurement for a UE to perform may include measuring a linear average of a total received power (in W) observed only in OFDM symbols of measurement time resource(s) over the whole carrier bandwidth (referred to as component carrier (CC)-RSSI). The UE may be requested to measure the CC-RSSI in one or multiple carriers (cross-carrier). This type of measurement can be used in conjunction with LBT procedure for instance. This type of measurement can reflect the interference situation if a gNB and the UE do not transmit in the associated OFDM symbols where the measurement is performed. The first type of measurement basically measures all the power (or energy) received during the duration of the OFDM symbols and within the whole carrier bandwidth without differentiating the contributions of power (or energy) from channels/signals transmitted by the serving gNB (or other UEs under the serving gNB). Therefore, a gap is needed (or configured) for the measurement to take place. For example, an interference measurement resource or CSI-IM resource may be configured as one or more OFDM symbols occupying all sub-carriers of a carrier or a BWP if configured. The measurement time granularity is then in the unit of an OFDM symbol which varies with the sub-carrier spacing (SCS), for example 480 KHz or 960 KHz, of the carrier. In another example, if a measurement gap is used, the measurement may be performed similarly to the CCA energy sensing where a sensing slot is, for example, a 5 us or 9 us time interval and is not dependent on the SCS of the carrier.

In some embodiments, the carriers specified by gNB for measurement may be wideband carrier (two or more adjacent carriers) or may be a carrier aggregation (two or more carriers where at least two may be non-adjacent). The carrier combinations may be specified via a bitmap or indicator in a DCI. The gNB may specify a different energy detection threshold for each of the carriers, where the UE uses these energy thresholds to report back the interference measured via an IMI Map. The gNB may specify a duration of measurements (gap) during which a measurement on a carrier is performed. The duration of measurement may be associated (derived) from an LBT type that may be different for each of the carrier. For instance, the gap to measure a carrier may be specified as a time duration rather than a number of symbols or slots, which may be selected via an indicator provided in the DCI. In an embodiment, the gap duration for measurement is communicated via an indicator of the associated LBT type provided in a DCI.

In an embodiment, the gNB may collect cross-carrier interference indications from multiple UEs separately or as a group of UEs, and use the collected information to select resources for the next channel occupancy times (COTs).

A second type of measurement may generate a CSI Received Signal Strength Indicator (CSI-RSSI), based on a linear average of a total received power (in W) observed only in OFDM symbols of measurement time resource(s) and over a measurement bandwidth. The measurement bandwidth may include N number of resource blocks from various sources, including, e.g., co-channel serving and non-serving cells, adjacent channel interferences, thermal noises, etc. The measurement time resource(s) for CSI-RSSI corresponds to OFDM symbols containing configured CSI-RS occasions, as specified in TS 38.215. An example of such type of measurement is a CSI-RSSI on CSI-IM resources for interference measurement. This type of measurement can reflect the interference situation if a gNB and UEs do not transmit in the associated OFDM symbols where a gap is needed (or configured) for the measurement to take place. If no NZP CSI-RS resource is associated with the CSI report, this type of measurement seems not applicable.

In a case that a CSI-IM resource is configured for a CSI report of an interference measurement, the measurement is performed in the OFDM symbols of the CSI-IM resource and over the resource elements (REs) of the CSI-IM resource. The measurement may be defined as a linear average over a power contribution (in W) of the resource elements of the CSI-IM resource (or other types of IMR resources). As a signal is specified to the UE for reception over the CSI-IM resource, the measurements may also be defined as a linear average of the noise and interference power contribution (in W) of the resource elements of the CSI-IM resource (or other types of IMR resources). Within each of the physical resource block (PRB) configured by a radio resource control (RRC) parameter freqBand, the CSI-IM resource may be configured to have a pattern of 1 OFDM symbol occupying 4 contiguous REs in the frequency domain (hence 4 by 1 as in the frequency and time domain), or a pattern of 2 contiguous OFDM symbols occupying 2 contiguous REs (hence 2 by 2 as in the frequency and time domain). Therefore, the measurement granularity in the time domain is 1 OFDM symbol or 2 OFDM symbols.

According to 3GPP TS 38.331 V16.4.1, a single resource setting may be configured for a CSI report, and the resource setting (e.g., given by a higher layer parameter csi-IM-ResourcesForInterference) is for interference measurement for the CSI report. The CSI report of the embodiments may be an L1 interference measurement (L1-IM) report (e.g., indicating whether interference (measured energy, or received energy) on a channel or resource is above a threshold of energy detection), an L1 energy detection (L1-ED) report (e.g., indicating measured energy on a channel or resource), or an L1 channel sensing (L1-CS) report (e.g., indicating whether a channel or resource is available or not). In the following, we denote such a CSI report as an L1-IM report without losing generality in the following descriptions. The L1-IM report may be any of the above described L1-IM report, L1-ED report or L1-CS report. The L1-IM report include energy measured in a configured resource of a channel, and may include a specific spatial direction. The L1-IM report may indicate an interference level or whether the channel is available in the configured resource. The L1-IM report may also include other report quantities, such as RI, CQI, RSRP, SINR, CRI, SSBRI, etc.

Each CSI resource setting CSI-ResourceConfig may include a configuration of a list of S≥1 CSI resource sets (e.g., given by a higher layer parameter csi-RS-Resource-SetList), where the list may include references to either or both of NZP CSI-RS resource set(s) and SS/PBCH block set(s), or the list may include references to CSI-IM resource set(s). Each CSI resource setting may be located in a DL BWP identified by a higher layer parameter BWP-id, and all CSI resource settings linked to a CSI report setting have the same DL BWP. According to TS 31.214 Section 5.2.1.1, V16.5.0, each CSI reporting setting CSI-ReportConfig is associated with a single downlink BWP (indicated by the higher layer parameter BWP-Id) given in the associated CSI-ResourceConfig for channel measurement, and includes the following parameter(s) for one CSI reporting band: codebook configuration including codebook subset restriction, time-domain behavior, frequency granularity for CQI and PMI, measurement restriction configurations, and the CSI-related quantities to be reported by the UE, such as the layer indicator (LI), L1-RSRP, L1-SINR, CRI, and SSBRI (SSB Resource Indicator).

According to 3GPP TS 38.331 V16.4.1, the time domain behavior of the CSI-RS resources within a CSI resource setting may be indicated by a higher layer parameter resourceType and can be set to be aperiodic, periodic, or semi-persistent. For periodic and semi-persistent CSI resource settings, the number of CSI-RS resource sets configured is limited to S=1. For periodic and semi-persistent CSI resource settings, the configured periodicity and slot offset may be given in the numerology of the associated DL BWP, as given by BWP-id. When a UE is configured with multiple CSI-ResourceConfigs including the same NZP CSI-RS resource ID, the same time domain behavior shall be configured for the CSI-ResourceConfigs. When a UE is configured with multiple CSI-ResourceConfigs consisting the same CSI-IM resource ID, the same time domain behavior shall be configured for the CSI-ResourceConfigs. All CSI resource settings linked to a CSI report setting shall have the same time domain behavior.

In an embodiment, a CSI-IM over periodic or semi-persistent resource allocations may not be averaged over multiple periods, and the energy in each CSI-IM resource set may be measured separately and compared with an energy threshold. An interference measurement indicator (IMI) report (e.g., a PUCCH IMI report) may be made after each measurement or period, or may cover several CSI-IM repetitions (i.e., the CSI-IM is performed repetitively for multiple times). An IMI report may include measurement results of one or more resources configured to be measured. The IMI report may include an IMI indicating a measurement result of a resource or a resource set. The IMI may be a 1-bit value indicating an interference status on the resource. As an example, the interference status is determined based on energy detection on the resource, and may indicate whether the resource is busy or idle based on the energy detection and a threshold. Thus, the IMI may also be understood as an indicator indicating whether the resource is busy or idle. As an example, an IMI corresponding to a resource may have a value of 1 indicating that the resource is available, and a value of 0 indicating that the resource is unavailable. An another example, a value of 0 may be used to indicate an available resource and 1 may be used to indicate an unavailable resource. An IMI report may include multiple IMIs (may be referred to as an IMI map) corresponding to multiple resources. If the PUCCH IMI report covers multiple CSI-IM repetitions on a resource, the corresponding IMI may be set to one (indicating that the resource is available in this example) if all CSI-IMs performed on the resource have a result of low interference (or available), or set to one if a minimum number of CSI-IM repetitions on the resource have a result of low interference (or available). In one embodiment, a condition to set an IMI to one may correspond to a pattern of low interference of multiple CSI-IMs. The condition is satisfied when the pattern is found. For instance, a pattern may be defined as follows: out of k+p CSI-IM repetitions, m of the first k CSI-IM repetitions must be with low interference, and n of the last p repetitions must be with low interference, where k, p, m and n are integer numbers.

A UE may measure the interference in a CSI-IM resource set, and compares the measurement result with an energy detection (ED) threshold. The UE may detect received energy in the CSI-IM resource set. The ED threshold may be provided via a higher layer configuration and associated with a CSI-IM resource set bandwidth coverage. For instance, if an ED threshold configured for the entire carrier bandwidth or bandwidth part (BWP) is ED, and the CSI-IM resource set represents x % of the entire carrier bandwidth or BWP, the ED threshold for an IMI report corresponding to the measurement in the CSI-IM resource may be x % of ED.

It is desirable that the allocation of a CSI-IM resource set in the time and frequency domain for a corresponding CSI-IM offers enough interference information for the allocated resource that may be used for future transmissions.

In an embodiment, a gNB may indicate the number of periodic CSI-IM resources that correspond to a time gap, or the gNB may indicate directly the time gap during which a UE must measure interference and report an IMI. The time gap may correspond to an LBT type. As used herein, a time gap is a time interval where a gNB does not transmit energy over specified CSI-IM resources. A UE may perform a measurement on the CSI-IM resources (e.g., in the frequency domain) during the time gap.

A CSI-IM resource configured for an L1-IM report may be shared among multiple UEs to perform their respective measurements. These UEs may share the CSI-IM resource for interference measurement since no specific signal is indicated to the UEs for processing, such as for channel estimation or signal detection. The behavior of the UEs over the CSI-IM resource is generally the same.

However, in the case of frequency range 2 (FR2) communications or when beamforming is performed, the UEs will receive their downlink signals or channels using receiving beams or spatial filters. The receiving beams differ from UE to UE and may change over time for a UE. After a beam management procedure is conducted between a gNB and a UE through transmissions of downlink signals (e.g., SS/BCH and/or CSI-RS) and uplink reports (e.g., L1-RSRP/L1-SINK and downlink signal indexes), the gNB may obtain the necessary information of beamforming for downlink transmissions. The gNB may also configure and indicate to a UE a DM-RS port of a PDCCH or CSI-RS port(s) of a CSI-RS resource, e.g., through a TCI state (TCI-state) that includes parameters for configuring a quasi co-location (QCL) relationship between one or two downlink reference signals and DM-RS ports of a PDSCH. Via configuration and indication of the QCL relationship to the UE, the UE may set the receiving beam or spatial filter properly.

In the case of an L1-IM report, the TCI-state and hence QCL information may need to be indicated to the UEs for interference measurement, since the interference measurement should reflect the interference situation when a UE receives downlink channels or signals intended for it. For a reference signal, such as a NZP CSI-RS used for channel measurement, its associated TCI-state and hence QCL relationship may be configured explicitly. When a CSI-IM is performed jointly with a NZP CSI-RS measurement for CSI report, such as reporting a channel quality indicator (CQI), a CSI-IM resource for the interference measurement may be based on the TCI-state and QCL of the associated NZP CSI-RS resource for the NZP CSI-RS. Therefore, in this case, the TCI-state or QCL information is not configured explicitly for the CSI-IM. In another case, for the L1-IM report, when no NZP CSI-RS or other signals are used jointly with a CSI-IMR for measurement, no TCI-state or QCL information may be derived for CSI-IM from these signals. In this case, an explicit indication of the TCI-state or QCL information for CSI-IM may be configured to a CSI-IM resource as in the case of a NZP CSI-RS resource. However, only relying on a RRC configured TCI-state or QCL information may not cope with the time-varying beamforming nature of downlink transmissions, or may not enable different UEs to share the same CSI-IM resource for interference measurement. In an example, a TCI indication field (also referred to as a TCI field for simplicity) may be used in a DCI that triggers the L1-IM report, where the TCI indication field explicitly indicates a TCI-state and QCL information for interference measurement.

As an example, when a UE-specific DCI format for scheduling a downlink transmission is used to trigger an L1-IM report, a TCI field (of the UE-specific DCI format) that indicates a TCI-state and QCL information of a PDSCH transmission may also indicate a TCI-state and QCL information for L1-IM and report triggered over an associated measurement resource. An another example, a TCI-state and QCL information configured for a control resource set (CORESET) of a DCI may be used for L1-IM and report triggered over an associated measurement resource.

When a group DCI is used to trigger an L1-IM report from multiple UEs, a TCI field is needed to indicate, to each UE, a TCI-state and QCL information (e.g., at least 'QCL-TypeD') for interference measurement by the UE over an associated interference measurement resource. A number of candidate TCI-states (and QCL information) may be configured for each UE, and the TCI field indicates a selected one of the candidates.

In addition to a spatial RX parameter (i.e., 'QCL-TypeD'), the QCL information may also include following:

'QCL-TypeA': {Doppler shift, Doppler spread, average delay, delay spread}
'QCL-TypeB': {Doppler shift, Doppler spread}
'QCL-TypeC': {Doppler shift, average delay}.

For interference measurement, the spatial RX parameter (i.e., QCL-TypeD) is needed. The other QCL information, e.g., QCL-TypeA, QCL-TypeB or QCL-TypeC, may not be strictly needed as channel estimation over a measurement resource may not be needed. Therefore, for a TCI-state specific for a CSI-IM, it may be that only 'QCL-TypeD' is configured. In the case that TCI-states are shared or reused with other channel/signal reception, one of the QCL types A, B and C may be configured in addition to 'QCL-TypeD' and the corresponding QCL information (for example, an average delay) may be used by a UE for interference measurement. In an embodiment, a new QCL type may be introduced to only include QCL information (in addition to 'QCL-TypeD') needed for interference measurement. For example, a 'QCL-TypeE' may be defined to include at least an average delay.

For reporting assistant information to assist on a gNB's decision of transmission after a CCA, other type of measurements and reports may be considered, for example, a CQI report or an SINR report, both of which may be referred to as CSI reports. These CSI reports reflect both channel and interference conditions and hence can better reflect the overall situation at a receiver. In this case, in addition to an interference measurement resource such as a CSI-IM resource, a channel measurement resource (CMR) will also be needed for these CSI reports. In the case that a number of UEs are triggered for these CSI reports, each UE will need to have a CMR triggered and transmitted, and the overhead can be substantially higher.

When a UE receives a DCI indicating that the UE perform an L1-IM for specified/configured resources, the UE may start measuring the received energy over the resources specified (e.g., a number of resource blocks, or a number of carriers) for a duration of OFDM symbols of measurement time resources. In an embodiment, intra carrier resources may be represented by CSI-IM resources, and cross carrier resources may be carrier resources or CSI-IM resources over multiple carriers.

The frequency resources and the OFDM symbols for an interference measurement may be configured by an upper layer, for instance, via a RRC configuration. The interference measurement may be performed over time resources in various ways. In one embodiment, a UE may measure the energy (i.e., interference) in specific patterns in the frequency and time domain for multiple instances of CSI-IM. In another embodiment, a UE may measure, for a continuous number of symbols, slots or subframes, the received interference (energy) on the specified resources.

After the measurement is effectuated, a UE may report back to a base station via PUCCH resources (frequency and time), which may be configured by higher layers, for instance, by a RRC configuration.

In some embodiments, in its report, the UE may indicate, for each resource or each carrier that is measured, an interference level observed, which may be quantized in bits, via an interference measurement indicator (IMI) map. In one embodiment, the UE may feedback one bit per resource or carrier, and thus for measurement on multiple resources, the IMI map may be multiple bits. For example, a PRB (12 subcarriers) in one OFDM symbol may be configured for IM. The UE feedback bits corresponding to each of the 12 subcarriers. A bit may be set to one if the resource or carrier is sensed as idle (i.e., having low interference), and otherwise, set to zero if the resource or carrier is sensed as busy. In one example, the UE may use an energy threshold to compare the received energy on a resource (e.g., time-frequency resource). If the received energy is less than the energy threshold, the bit corresponding to the resource may be set to one. The energy threshold may be configured by higher layers. In another example, the feedback bit may be set if a minimum condition is satisfied. For instance, a feedback bit may be set to one when detected energy of a minimum number of resource sets (such as CSI-IM resource (sub)sets) is less than an energy threshold. In another example, the UE may feed back a single bit corresponding to all configured resources (e.g., one or more configured resource sets). The IMI map may include one or more entries, and each entry is one bit. Each entry in the IMI map may correspond to a resource, a resource element, multiple resources (or resource elements), or a resource set.

In one embodiment, a UE may use a spatial RX filter to perform the interference measurement. Information of the spatial RX filter may be provided in the contained TCI field in a DCI. For example, each resource in a resource set to be measured may have a corresponding direction, and the receiver may need to measure the interference in that particular resource (in frequency and time) toward that particular direction. A configured resource for IM may include a time resource, a frequency resource, a spatial resource, or a combination thereof.

A UE may belong to one or more groups of UEs configured by higher layer signaling (e.g., RRC signaling). A DCI may be addressed to a group of UEs. When a DCI is addressed to a group of UEs, CRC of the DCI may be scrambled with a group specific RNTI. When a UE receives a DCI, the UE may blindly decode the DCI using its available RNTI codes. If a group RNTI is identified, the UE may use configured parameters associated with a UE group associated with the group RNTI.

An energy threshold used by a UE for reporting an IMI may be configured by higher layers. The energy threshold may be configured for the total energy per carrier for the cross-carriers case, or for the energy per CSI-IM resource for the intra-carrier case. The value of the energy threshold may be selected based on regulatory requirements (such as LBT requirements), or based on the received power of the interference that can be tolerated for a specific transmission modulation and coding scheme (MCS) selection.

The signaling to implement the proposed solutions may include a DCI carrying a triggering indication to one UE or a group of UEs, and a PUCCH report (e.g., via an IMI map) from a UE performing an interference detection. For example, the PUCCH report may be a L1-IM. In an embodiment, the DCI signaling may be implemented by extending the existing DCI formats with new fields or by a new DCI format.

In one embodiment, a DCI format X_Y may be used to trigger an L1-IM report for a group of UEs, where "X_Y" is a placeholder for a format name that has not been specified. As used herein, a DCI with the DCI format X_Y will be referred to as a DCI X_Y. The DCI X_Y is with CRC scrambled by a RNTI value configured to the group of UEs that intend to receive the DCI. A UE may be assigned or configured with a set of bits (and fields) within the DCI X_Y for information intended for the UE.

In one embodiment, the DCI X_Y may include, for a UE, a field for TCI, which may be a TCI indicator of a higher layer parameter that indicates an RS index for QCL_TypeD for a corresponding TCI state. In another embodiment, other types of QCL may be provided as well by the DCI X_Y. If the field is not present in the DCI X_Y, the UE may be configured via higher layers with a corresponding TCI state for IM.

In one embodiment, the DCI X_Y may include, for a UE, a field for IM trigger (also referred to as an IM trigger field) to request the UE to perform an L1-IM report. The IM trigger field may only indicate whether a L1-IM report is requested from the UE or not. The associated interference measurement resource (such as a CSI-IM resource) and its trigger timing offset may be configured by RRC signaling. The measurement resource may be available on an aperiodic or periodic basis and configured via a periodic CSI-IM resource set. The CSI-IM resource set may be configured by an upper layer parameter, where the UE is requested to measure the interference and report L1-IM over the CSI-IM resource set. The CSI-IM Resource set may include one or multiple carriers (cross-carriers) or sets of resources in the same carrier. The CSI-IM resource set is resources carrying no transmissions from a gNB for a measurement interval or measurement instances. A pattern and time periodicity of the CSI-IM resource set may be defined such that a UE measurement is reliable and covers the intended resources for DL transmissions where measurement of interference needs to be performed.

If a DCI is scrambled with a UE group RNTI, all UEs that belong to the same group may measure and report on the same CSI-IM resource set.

To reduce the overhead of signaling or the DCI size, in one embodiment, the IM trigger field may be a common field for all UEs configured to detect a DCI X_Y with an associated RNTI value for CRC scrambling. In this embodiment, the UEs may be triggered simultaneously for L1-IM reports. The interference measurement resource(s) (for example CSI-IM resource(s)) may be configured to associate with a group DCI X_Y of the associated RNTI value.

It is noted that multiple parameters for the interference measurement may be configured by the higher layers via RRC. However, in some embodiments, one or more of these parameters may be optionally provided through a DCI. In one embodiment, if the one or more parameters are included in a DCI, they take precedence over higher layer configurations. The following describes example parameters that may be optionally included in the DCI, which include CSI-IM time domain indicator, IM ED Threshold, Period-icity-and-Offset, and IMI Bit Length. The DCI may include any one or more of these parameters.

The CSI-IM time domain indicator may identify an entry in a higher-level parameter that specifies CSI-IM configurations for measuring interferences. A field for this parameter may be present for a UE in a DCI to indicate a trigger timing offset, i.e., the time between receiving the trigger DCI and transmission of a triggered CSI-IM report.

The IM ED Threshold determines an energy threshold per resource that is to be used for IMI determination. For an L1-IM, the IM ED Threshold may be derived from a CCA ED threshold specified by the spectrum regulators. In the case that an interference measurement resource or a CSI-IM resource occupies the whole shared spectrum channel, the IM ED Threshold can be the same as the CCA ED threshold.

The Periodicity-and-Offset may be used to indicate a single (one-shot) report associated with one instance of a CSI-IM and a L1-IM report, or to activate a number of instances of a CSI-IM and a L1-IM report with certain periodicity. A UE may perform the L1-IM and report it for each period. The CSI-IM resource set may have the same period and offset as the PUCCH L1-IM report.

The IMI Bit Length indicates the number of bits to encode an interference measurement result for each resource (or resource element) of a CSI-IM resource set. Each resource element has a corresponding IMI that maps an interference measurement result to a resource element of the CSI-IM resource set, where the IMI corresponding to the element of the resource set has an associated IMI Bit Length, i.e., the number of bits that is used to quantify the corresponding interference level (measurement result of a corresponding element).

The DCI may optionally include one or more of following example parameters for interference statistics measurement: a channel state information-interference measurement (CSI-IM) time domain indicator indicating a CSI-IM configuration for interference statistics measurement; a parameter Periodicity-and-Offset indicating a periodicity and a timing offset for the interference statistics measurement and reporting; and a parameter Statistics-Type indicating a type of interference statistics per resource to be reported by the UE. The type of interference statistics may include an average clear channel duration, a standard deviation of clear channel durations, an average busy channel duration, a longest clear channel duration, a shortest clear channel duration, a longest busy channel duration, a shortest busy channel duration for a duration of a measurement period, or any combination thereof.

A UE configured for interference statistics measurement may report the measured interference statistics, which may be included in an interference measurement report, e.g., an L1-IM report, sent by the UE to a gNB. The report may include an interference statistics measurement indicator (STA-IMI) indicating statistics of measurement results of a resource or a subset of the resource. The statistics may include an average clear channel duration, a standard deviation of clear channel durations, an average busy channel duration, a longest clear channel duration, a shortest clear channel duration, a longest busy channel duration, a shortest busy channel duration for a duration of a measurement period, or any combination thereof, as configured by DCI.

The following show examples of how the proposed methods may be applied for implementing CCA based receiver feedback for one carrier or multi-carriers. The embodiments provide methods for receiver-assisted cannel access in the unlicensed spectrum based on CCA. A UE performs a CCA on a measurement resource to determine whether the measurement resource is idle or not. The UE may measure/detect received energy on the measurement resource, and compare the received energy with an ED threshold to generate a measurement result, which may be indicated by an IMI. When the received energy is less than the ED threshold, the measurement resource is determined to be idle and the CCA is determined to be passed (or succeed); otherwise, when the received energy is not less than the ED threshold, the measurement resource is determined to be busy and the CCA is determined to fail. In the embodiments, the UE may be configured to perform measurements on one or multiple carriers, which are used as measurement resources merely as illustrative examples. The embodiments may be applied for measurement on one or more resource sets, resources of one carrier, or resources of multiple carriers, specific frequency resources, time resources, spatial resources, etc. In the embodiments, the CCA is passed (succeeds) means that a CCA condition is passed or satisfied (e.g., a CC-RSSI or L1-IM per carrier is less than the ED threshold) and a PUCCH CCA indicator stands for a PUCCH IMI for an individual carrier. The UE may be configured to perform CCA over an entire or a portion of carrier bandwidth. In the embodiments, the CCA performed corresponds to a UE measurement that is requested in a DCI X_Y and that is to be reported to a gNB. Note that the UE may send back a report even when the CCA fails (if instructed by the gNB), and the gNB is able to receive the report because there is no interference at the gNB. This is not the case for a LBT procedure, where if the LBT procedure fails, a device performing the LBE procedure must postpone its transmission.

A LBT procedure is required in an unlicensed band between successive transmissions or receptions. Prior to a COT, a device, e.g., a gNB, may execute longer LBT, or LBT category 4, which consists of sensing a channel and waiting for an exponential truncated backoff period if the channel is sensed busy. During the COT, the device may be required to have a shorter, deterministic LBT. Depending on a gap length due to processing and switching time between receive and transmit, a gNB and a UE may or may not be required to execute a LBT procedure during the COT.

In one embodiment, the DCI X_Y may specify one or more conditions that need to be satisfied at a receiver side for a transmission to the receiver to take place. For instance, a gNB may provide a UE with an interference or energy detection threshold, together with a resources list and durations for checking the conditions, via a DCI X_Y. As an example, the condition may require that the average energy for specified measurement resources, e.g., carriers, to be less than a threshold during a measuring window time interval. However, the same condition may also be configured for a UE from higher layers, for instance, on a per carrier basis.

Figure 11:
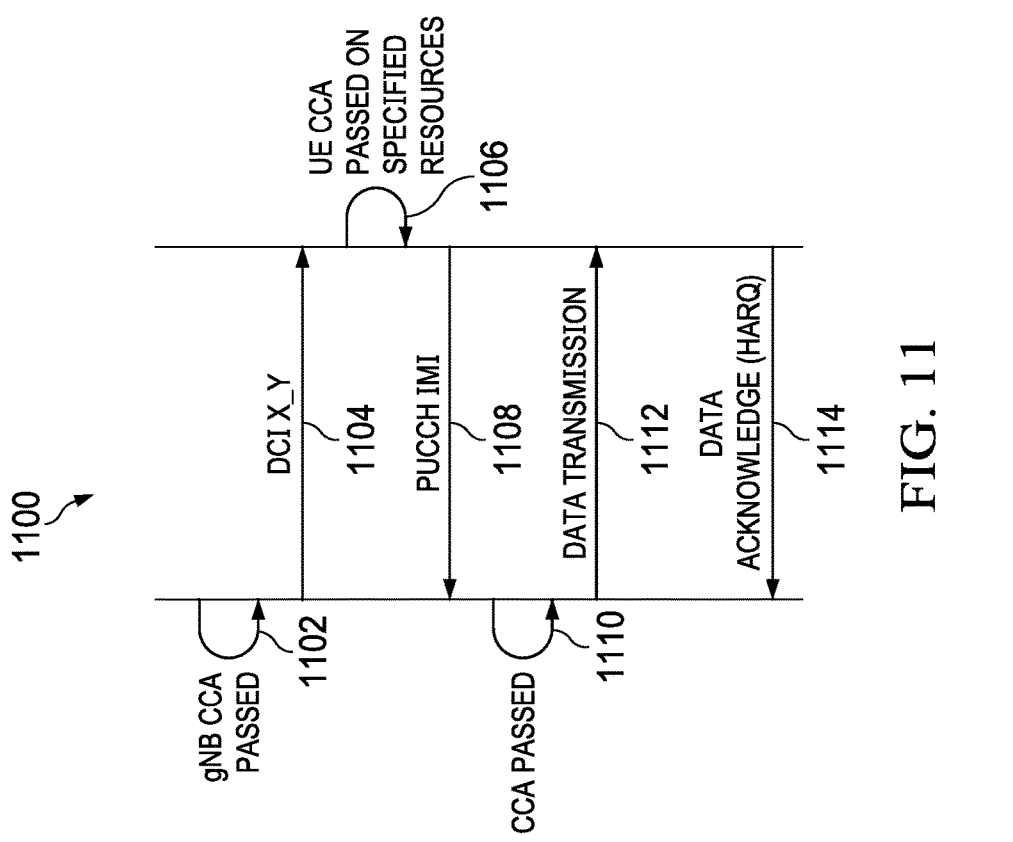
FIG. 11 is a diagram of an embodiment method for receiver-assisted channel access in an unlicensed spectrum.

In the embodiments, a UE performs a CCA for interference measurement to determine interference status of a measurement resource, i.e., a carrier in the embodiments, based on which the UE provides receiver-assistance information to a gNB for downlink transmissions. FIG. 11 is a diagram of an embodiment method 1110 for receiver-assisted channel access in an unlicensed spectrum. In this example, a UE feeds back a measurement report to a gNB indicating an available carrier. The gNB may perform a CCA on a carrier (channel) in the unlicensed spectrum, e.g., when it intends to transmit data to the UE on the carrier. When the CCA is passed (step 1102), that is, when the gNB determines that the carrier is available based on the CCA, the gNB may send a DCI X_Y to the UE requesting the UE to perform an interference measurement on the carrier (step 1104). The gNB may specify the carrier to the UE for the UE to perform the interference measurement on the specified carrier. A condition may be specified that may be used to trigger a measurement report of the UE and/or to determine whether or not a UE's CCA is passed (i.e., the specified carrier is idle). As an example, the condition may require that the received energy on a specified carrier be less than a threshold. In case of multiple carriers, each of the carriers may be associated with a corresponding condition, e.g., an energy threshold. After receiving the DCI X_Y, the UE may perform a CCA on the specified carrier. For example, the UE may measure the received energy on the specified carrier, e.g., a subset of frequencies or the bandwidth of the specified carrier, against the threshold, which may be specified by the gNB or configured by higher layers. The UE's CCA is passed (step 1106), i.e., the carrier is determined to be idle, and the UE may send, on a PUCCH, an L1-IM report including an IMI (step 1108) for the carrier. In this example, an IMI corresponds to a carrier. The IMI of the carrier may be set to one (1) indicating that the carrier has passed the CCA (or satisfied the condition) and the carrier is available for use. The gNB receives the PUCCH IMI of the carrier, and may optionally perform a second CCA to make sure that the carrier is available from the gNB's perspectives. When the second CCA is passed (step 1110), the gNB may transmit a data transmission to the UE (step 1112) in the carrier. The gNB may not perform the second CCA, and transmit the data transmission to the UE upon receiving the PUCCH IMI indicating that the carrier is available. The UE may transmit, upon successfully receipt of the data transmission, a data acknowledge message, e.g., a hybrid automatic repeat request (HARQ) message, to the gNB, acknowledging receipt of the data transmission (step 1114).

The gNB, who requests the interference measurement may be referred to as an initiator of an IM or an IM report. The initiator, i.e., the gNB in this example, may request the UE to perform interference measurements on multiple resources (e.g., multiple carriers). In this case, after receiving a measurement report of the multiple resources from the UE, the gNB may proceed with transmissions on those resources confirmed by the UE, i.e., determined to be idle. In other words, the UE may not expect to receive a transmission or grants on resources found unavailable (due to too much interference based on the measurements of the UE). The UE may send a PUCCH IMI report about a carrier even if it senses that the carrier is busy, if instructed to do so by the gNB. In another embodiment, the UE may not send a report of the carrier (channel) sensed unavailable, and based thereon, the gNB may infer that the resource (carrier) is busy.

Figure 12:
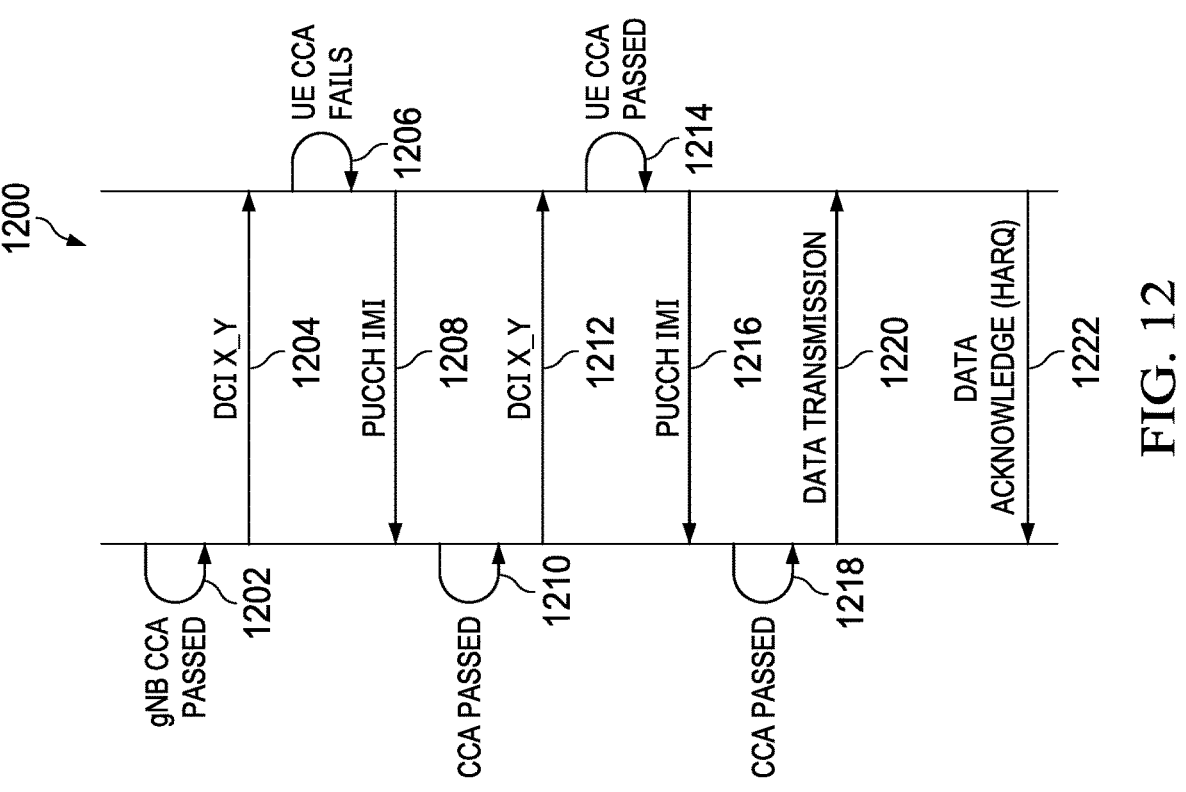
FIG. 12 is a diagram of another embodiment method for receiver-assisted channel access in an unlicensed spectrum.

FIG. 12 is a diagram of another embodiment method 1200 for receiver-assisted channel access in an unlicensed spectrum. In this example, a UE feeds back a measurement report to a gNB indicating an unavailable carrier. Similar to FIG. 11, the gNB may perform a CCA on a carrier in an unlicensed spectrum, e.g., when it intends to transmit data to the UE on the carrier. When the CCA is passed (step 1202), that is, when the gNB determines that the carrier is available based on the CCA, the gNB may send a DCI X_Y to the UE requesting the UE to perform an interference measurement on the carrier (step 1204). After receiving the DCI X_Y, the UE may perform a CCA on the specified carrier. Different from FIG. 11, in this example, the UE's CCA fails (step 1206). That is, the carrier is sensed unavailable based on the UE's CCA. The gNB may instruct the UE to report measurement on the carrier even when the UE's CCA on the carrier fails. Thus, the UE sends, to the gNB in a PUCCH, an IM report including an IMI corresponding to the carrier measured by the UE (step 1208). The gNB receives the PUCCH IMI, and may optionally perform a second CCA to make sure that the carrier is available from the gNB's perspectives. When the second CCA is passed (step 1210), the gNB may transmit another DCI X_Y to the UE, requesting the UE to perform another interference measurement on the carrier (step 1212). Upon receipt of the DCI X_Y, the UE may perform a CCA, which may succeed (step 1214), and sends a corresponding PUCCH IMI to the gNB (step 1216). The gNB may transmits, after performing a successful CCA (step 1218), the data transmission to the UE (step 1220). The UE receives the data transmission successfully and acknowledges the reception of the data transmission (step 1222). Steps 1214, 1216, 1218, 1220 and 1222 are similar to the steps 1106, 1108, 1110, 1112, and 1114 of FIG. 11, respectively, and details are thus not described again herein for simplicity.

Figures 13, 14:
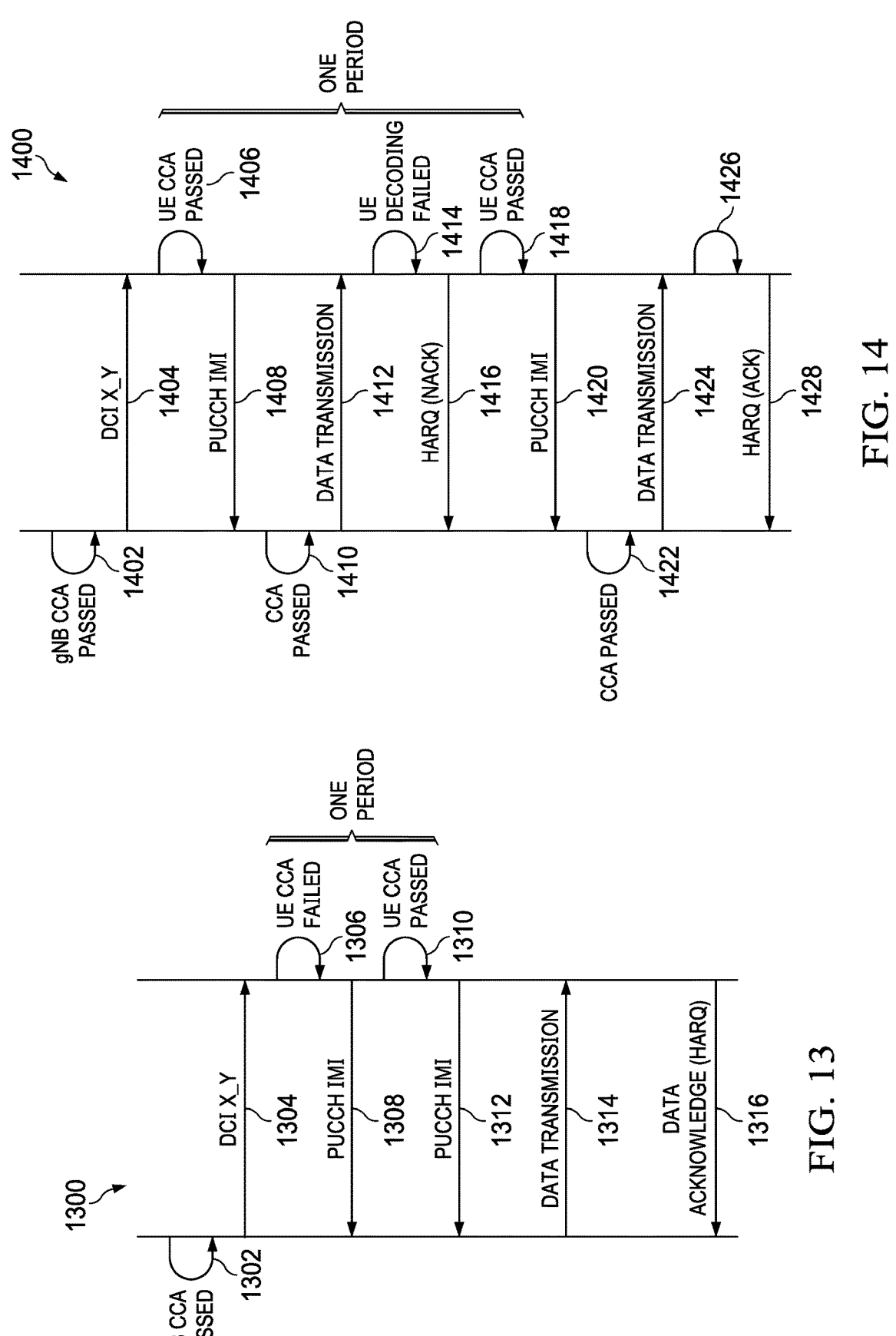
FIG. 13 is a diagram of another embodiment method for receiver-assisted channel access in an unlicensed spectrum.
FIG. 14 is a diagram of another embodiment method for receiver-assisted channel access in an unlicensed spectrum.

In some embodiments, a gNB may trigger a periodic reporting from a receiver (e.g., a UE). The reporting, for instance, may stop as soon as a minimum number of resources are found to satisfy a CC-RSSI or IM condition so that a data transmission may take place. FIG. 13 illustrate an example of this case. FIG. 13 is a diagram of another embodiment method 1300 for receiver-assisted channel access in an unlicensed spectrum. In this example, a UE periodically reports measurement results of a carrier to a gNB. The gNB may perform a CCA a carrier (channel) in an unlicensed spectrum, e.g., when it intends to transmit data to the UE on the carrier. When the CCA is passed (step 1302), that is, when the gNB determines that the carrier is available based on the CCA, the gNB may send a DCI X_Y to the UE requesting the UE to perform a periodic interference measurement on the carrier (step 1304). After receiving the DCI X_Y, the UE may perform a CCA periodically on the carrier during a period of time, e.g., a measurement window. The UE may perform multiple CCAs on the carrier during the measurement window, some of the CCAs may fail (e.g., step 1306), and some of the CCAs may succeed (e.g., step 1310). For each CCA performed, the UE may send a PUCCH IMI (i.e., an IM report) to the gNB indicating a CCA result (i.e., an interference measurement result), as shown in steps 1308 and 1312. The PUCCH IMI may indicate that the carrier is available (the CCA is passed) or unavailable (the CCA fails). When the received IM reports (PUCCH IMIs) satisfy a condition, the gNB may send a data transmission on the carrier to the UE (step 1314), and the UE may acknowledge receipt of the data transmission (step 1316).

In some embodiments, a gNB may configure a UE to feedback an IMI periodically until a successful transmission from the gNB to the UE takes place, as illustrated in FIG. 14. FIG. 14 is a diagram of another embodiment method 1400 for receiver-assisted channel access in an unlicensed spectrum. The gNB may perform a CCA on a carrier (channel) in the unlicensed spectrum, e.g., when it intends to transmit data to the UE on the carrier. When the CCA is passed (step 1402), that is, when the gNB determines that the carrier is available based on the CCA, the gNB may send a DCI X_Y to the UE requesting the UE to perform an interference measurement on the carrier (step 1404). Upon receiving the DCI X_Y, the UE may be triggered to perform a CCA on the carrier. For example, the UE may measure the received energy on the carrier and compare with a threshold. As an example, the UE's CCA is passed (step 1406), i.e., the carrier is determined to be available when the received energy is less than the threshold, and the UE may send, on a PUCCH, an IMI to the gNB (step 1408). The IMI indicates that the carrier is available for the UE. The gNB receives the PUCCH IMI, and may optionally perform a second CCA to make sure that the carrier is available from the gNB's perspectives. When the second CCA is passed (step 1410), the gNB may transmit a data transmission to the UE (step 1412). However, the UE may fail to decode the data transmission (step 1414), and thus transmit a HARQ negative acknowledgement (NACK) message to the gNB, indicating the failure to receive the data transmission (step 1416). The UE may then continue to perform another CCA on the carrier in the next period as configured by the gNB, and this CCA may succeed (step 1418). The UE sends an IMI to the gNB (1420) indicating the measurement result, i.e., the carrier is available. The gNB receives the PUCCH IMI, and may optionally perform a third CCA to make sure that the carrier is available from the gNB's perspectives. When the third CCA is passed (step 1422), the gNB may transmit the data transmission again to the UE (step 1424). The UE successfully receives the data transmission (step 1426), and sends a HARQ ACK message to the gNB acknowledging receipt of the data transmission (step 1428). If the UE still fails to receive the data transmission at step 1426, the UE may continue to perform another CCA on the carrier in the next period as configured by the gNB. The UE may periodically perform CCAs until the data transmission is successfully received by the UE from the gNB.

In some embodiments, an initiator gNB of a COT initiates the COT to transmit data to multiple responders UEs. The initiator gNB may trigger IMI reporting from a group of UEs, where each UE is configured by higher layers with a group DCI, where the group DCI is associated with an RNTI for CRC scrambling of the group DCI and has field(s) for the UE in the group DCI. The group DCI may be sent to the group of UEs requesting the UEs to perform interference measurements as discussed above. The group DCI may indicate the resources for each UE to monitor and measure, the QCL information (as indicated in the TCI state), and a PUCCH resource to send report. This case is shown in FIG. 15.

Figure 15:
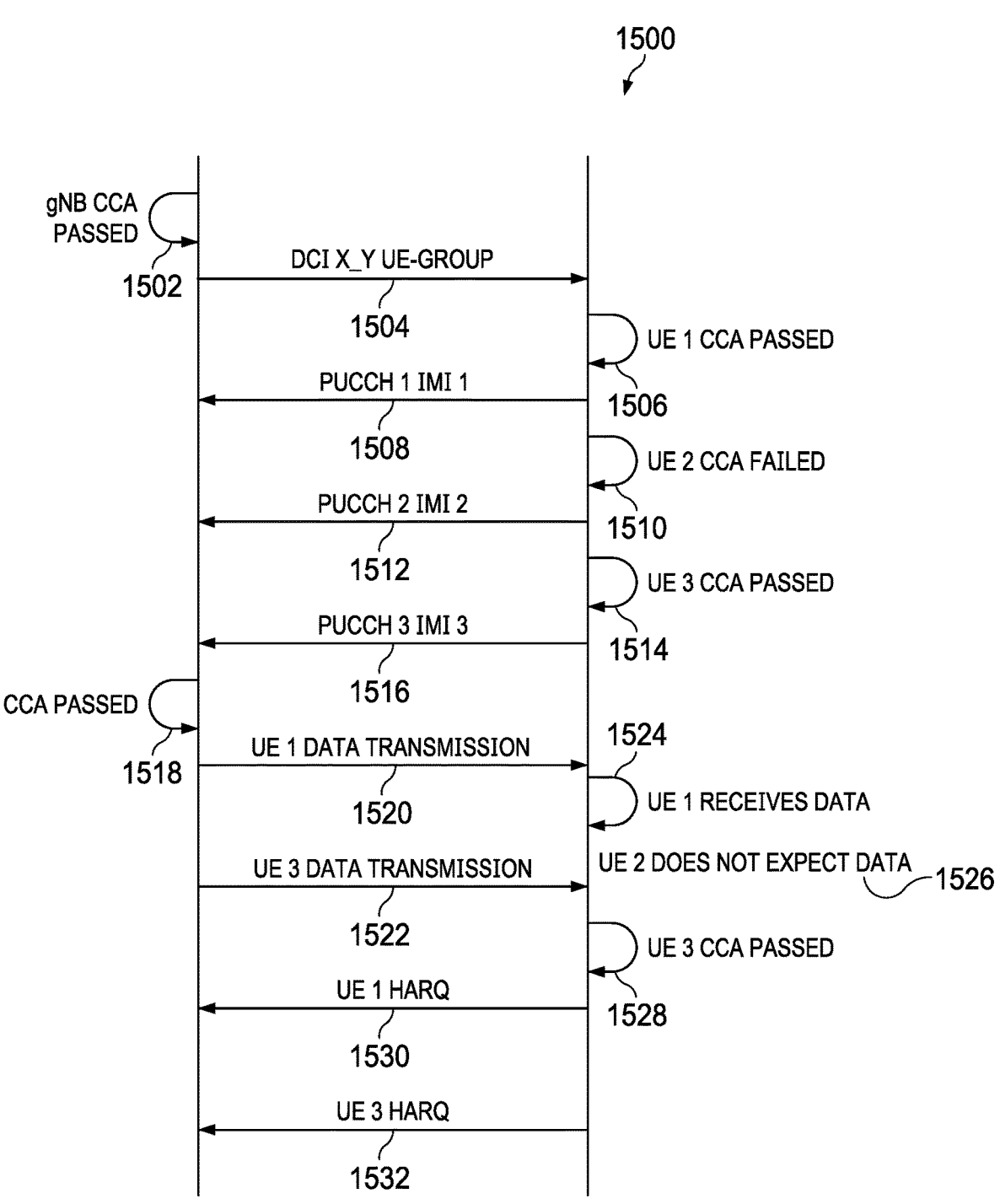
FIG. 15 is a diagram of another embodiment method for receiver-assisted channel access in an unlicensed spectrum.

FIG. 15 is a diagram of another embodiment method 1500 for receiver-assisted channel access in an unlicensed spectrum. In this embodiment, a gNB performs a CCA on a carrier (channel) for communications with a group of UEs, i.e., UE1-UE3 in this example. When the CCA is passed (step 1502), the gNB sends a group DCI X_Y to the group of UEs (step 1504), requesting each of the UEs to perform interference measurement on the carrier (channel). The group DCI X_Y may configure, for each of the UE1-UE3, resources to be measured, an energy detection threshold to be used, and other information, such as reporting resources, QCL information, etc. Upon triggered by the group DCI X_Y, each of the UE1-UE3 performs a CCA to measure the channel as configured. The UE1 performs the CCA and the CCA is passed (step 1506). The UE1 sends an IMI 1 on a PUCCH 1 (PUCCH 1 IMI 1) to the gNB reporting its measurement result (step 1508). The IMI 1 indicates that the channel is available for the UE1. The UE2 performs the CCA, however, the CCA fails (step 1510). The UE2 reports an IMI 2 on a PUCCH 2 (PUCCH 2 IMI 2) to the gNB (step 1512) indicating that the channel is not available for the UE2. The UE3 performs the CCA and the CCA is passed (step 1514). The UE3 reports an IMI 3 on a PUCCH 3 (PUCCH 3 IMI 3) to the gNB indicating that channel is available for the UE 3. When receiving the reports from the group of UEs, the gNB may optionally perform another CCA, and when this CCA is passed (step 1518), the gNB may determine whether to transmit to the group of UEs based on their respective reports. The gNB may determine to transmit to the UE1 and UE3 based on the received PUCCH 1 IMI 1 and PUCCH 3 IMI 3 (indicating that the channel is available for the UE1 and UE3), and transmit data transmissions to the respective UE1 and UE3 (steps 1520, 1522). The gNB may determine to not transmit to the UE2 based on the PUCCH 2 IMI 2 indicating that the channel is not available for the UE2. The UE2 may not expect to receive any transmission from the gNB since its CCA fails (step 1526). The UE1 and UE3 may receive their respective data transmissions (steps 1524, 1528) and send HARQ messages to the gNB (steps 1530, 1532) to indicate whether they successfully receive their respective data transmissions.

Figure 16:
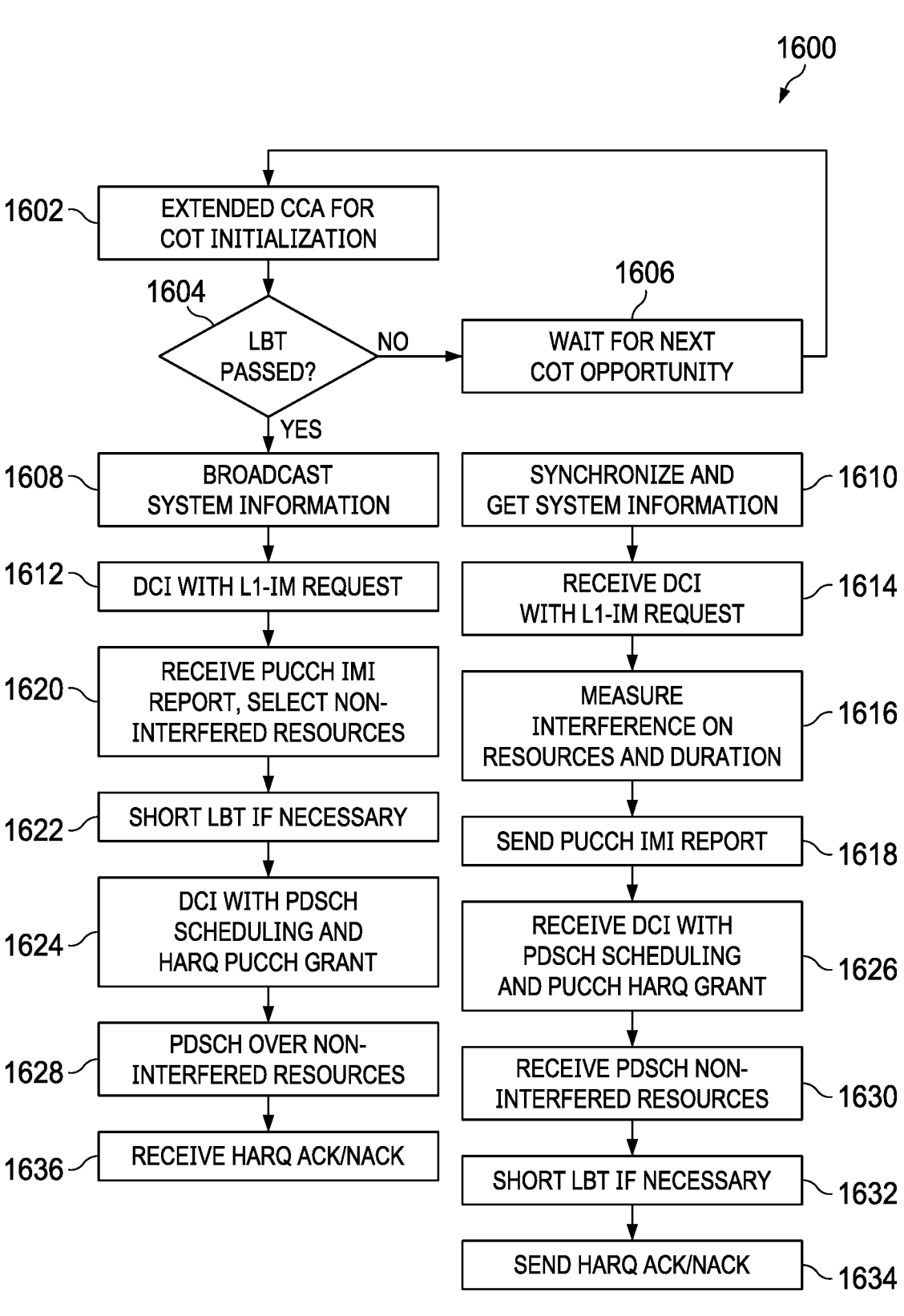
FIG. 16 is a diagram of another embodiment method for receiver-assisted channel access in an unlicensed spectrum.
Figure 19:
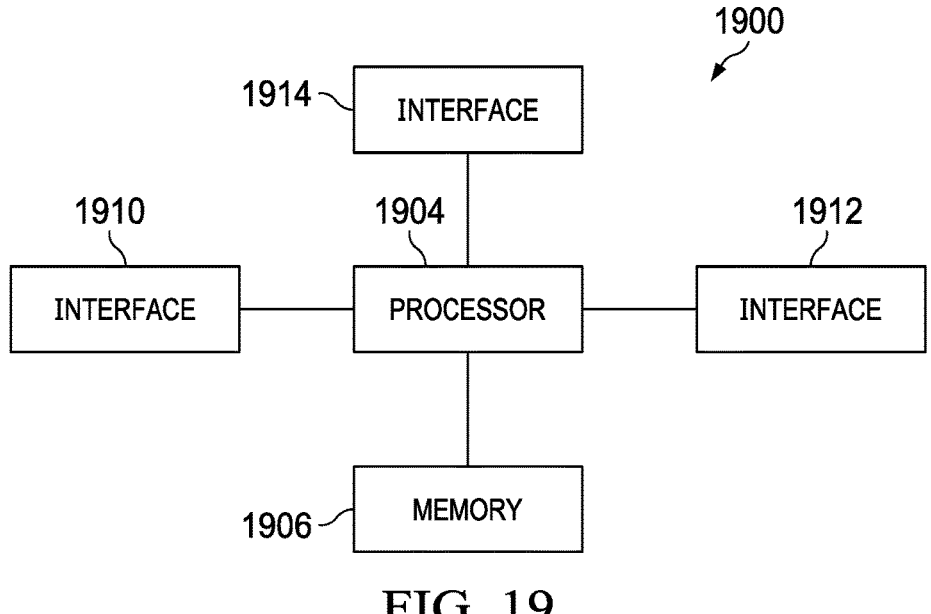
FIG. 19 is a diagram of an embodiment processing system.

FIG. 16 is a diagram of another embodiment method 1600 for receiver-assisted channel access in an unlicensed spectrum, highlighting gNB and UE behavior. A gNB may proceed to an LBT Category 4 (extended CCA) prior to initiating a COT in a channel of an unlicensed spectrum. The gNB may perform the extended CCA for COT initialization (step 1602). The gNB may determine whether the extended CCA succeeds or is passed (step 1604). When the extended CCA fails, the gNB may wait for the next COT opportunity (step 1606) and then proceed to step 1602 to perform extended CCA prior to the next COT opportunity. When the extended CCA succeeds, the gNB may broadcast system information in the channel (step 1608). The gNB may send periodically synchronization signals and system related parameters. A UE may synchronize with the gNB and acquire the system information (step 1610). The gNB may sends, to the UE or a group of UEs including the UE, a request requesting the UE or the group of UE to perform interference measurements on the channel (step 1612). The request may be, for instance, a L1-IM request sent via a DCI with CRC scrambled using a specific RNTI. The DCI may include indications indicating one or more (measurement) resources (e.g., one or more CSI-RS resource sets) to be measured, a TCI, whether the resources and reports of the interference measurements are aperiodic, periodic or semi-static, an energy threshold for each resource set (unless configured by a higher layer), reporting resources, QCL information, a measurement duration during which the measurement is to be performed, etc. The one or more resources may belong to the same carrier or different carriers. The UE may receive the DCI including the L1-IM request (step 1614).

The UE may decode the DCI and proceed to measure interferences on the indicated resources for a measurement duration (step 1616). The UE may then send a PUCCH IMI report to the gNB, indicating interference statuses of the indicated resources (step 1618). The PUCCH IMI report may include an IMI map for the resources measured by the UE, and the IMI map may indicates the interference statuses of the corresponding resources measured, e.g., whether or not a resource is available for the UE. The gNB may use the PUCCH IMI report received to schedule the next PDSCH transmission. The UE does not expect to receive a transmission over resources that are marked unavailable (e.g., zero in an IMI map). The gNB may receive the PUCCH IMI report, and based thereon, select one or more non-interfered resources (step 1620), i.e., resources indicated as available in the IMI report, from the resources measured by the UE. The gNB may perform a short LBT if needed (step 1622) to check whether the channel is still available for transmission by the gNB. The gNB may then send a DCI to the UE, where the DCI may include PDSCH scheduling and a HARQ PUCCH grant (step 1624). The PDSCH scheduling includes scheduling information of a downlink transmission, e.g., a PDSCH. The PDSCH scheduling may be determined based on the PUCCH IMI report, and the PDSCH may be scheduled on the one or more non-interfered resources selected. The UE receives the DCI with the PDSCH scheduling and the HARQ PUCCH grant (step 1626). The gNB may send data through the PDSCH, over the non-interfered resources that is reported in the PUCCH IMI report and selected by the gNB. The gNB sends the PDSCH over the non-interfered resources (step 1628), and the PDSCH is received by the UE over the non-interfered resources (step 1630). The UE may perform a short LBT if necessary (step 1632) to determine whether the channel in uplink is clear. When the channel is clear, the UE sends a HARQ ACK/NACK message to the gNB (step 1634) indicating whether the PDSCH is received successfully or not by the UE. The gNB receives the HARQ ACK/NACK message (step 1636). Note that depending of the gap between receive and transmit or between consecutive transmissions, the gNB and the UE may or may not be required to execute the short LBT during the COT.

FIG. 17 is a diagram of another embodiment method 1700 for receiver-assisted channel access in an unlicensed spectrum. The method 1700 may be indicative of operations performed at a base station, e.g., a gNB, that is operable in a shared spectrum or an unlicensed spectrum. As shown, the gNB may determine whether a communication channel in the shared spectrum is clear (block 1702). This may be performed by the gNB when there is data to be sent to a user equipment (UE) by the gNB in the shared spectrum. The gNB may send, upon determining that the communication channel is clear, a downlink control information (DCI) triggering the UE to measure a resource to determine whether the communication channel is available for the UE (block 1704). The gNB may receive, from the UE, a measurement report of the resource (block 1706). The gNB may determine whether to transmit data to the UE in the communication channel based on the measurement report (block 1708).

FIG. 18 is a diagram of another embodiment method 1800 for receiver-assisted channel access in an unlicensed spectrum. The method 1800 may be indicative of operations performed at a UE operable in a shared spectrum or an unlicensed spectrum. As shown, the UE may receive, from a gNB, a downlink control information (DCI) triggering the UE to measure a resource to determine whether the communication channel is available for the UE (block 1802). The UE may perform, upon triggered by the DCI, a measurement of received energy on the resource (block 1804), and generate a measurement report based on the measurement (block 1806). The UE may transmit the measurement report to the gNB (block 1808).

Figure 20:
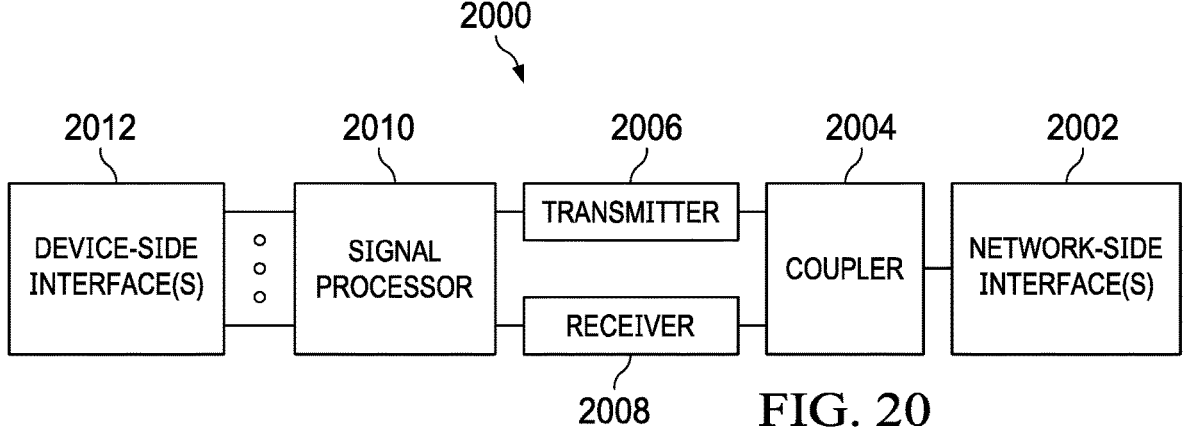
FIG. 20 is a diagram of an embodiment transceiver.

Embodiments of the present disclosure may be implemented as computer-implemented methods. The embodiments may be performed by a processing system. FIG. 20 illustrates a block diagram of an embodiment processing system 2000 for performing methods described herein, which may be installed in a host device. As shown, the processing system 2000 includes a processor 2004, a memory 2006, and interfaces 2010-2014, which may (or may not) be arranged as shown in FIG. 20. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in FIG. 20, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 2010, 2012, 2014 connects the processing system 2000 to a transceiver adapted to transmit and receive signaling over the telecommunications network. FIG. 21 illustrates a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present disclosure. Each of these references is incorporated herein by reference in its entirety:

3GPP TS 38.213, V16.5.0 (2021-03), "3rd Generation Partnership Project; Technical Specification Group Radio Access Network; NR; Physical layer procedures for control (Release 16)";

3GPP TS 38.214, V16.5.0 (2021-03), "3rd Generation Partnership Project; Technical Specification Group Radio Access Network; NR; Physical layer procedures for data (Release 16)";

3GPP TS 38.215, V16.4.0 (2020-12), "3rd Generation Partnership Project; Technical Specification Group Radio Access Network; NR; Physical layer measurements (Release 16)";

3GPP TS 37.213, V16.3.0 (2020-09), "3rd Generation Partnership Project; Technical Specification Group Radio Access Network; Physical layer procedures for shared spectrum channel access (Release 16)";

3GPP TS 38.331, V16.4.1 (2021-03), "3rd Generation Partnership Project; Technical Specification Group Radio Access Network; NR; Radio Resource Control (RRC) protocol specification (Release 16)".

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a channel sensing unit/module, a determining unit/module, a retransmitting unit/module, a configuring unit/module, an interference measuring unit/module, a reporting unit/module, a requesting unit/module, a triggering unit/module, and/or an energy detecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method performed by an apparatus, the method comprising:

determining whether a communication channel in a shared spectrum is clear for use when data is to be sent to a first UE by the apparatus;

sending, upon determining that the communication channel is clear, a first control information message triggering the first UE to measure a layer 1 (L1) resource to determine whether the communication channel is available for the first UE;

receiving, from the first UE after sending the first control information message, a first measurement report of measurement of the L1 resource;

determining whether to transmit the data to the first UE in the communication channel based on the first measurement report;

transmitting, based on the first measurement report that the communication channel is available for the first UE, the data to the first UE in the communication channel;

receiving from the first UE a negative acknowledge (NACK) message indicating that the data has not been successfully received by the first UE;

receiving, from the first UE after receiving the NACK message, a second measurement report of measurement of the L1 resource; and retransmitting the data to the first UE in the communication channel when determining, based on the second measurement report, that the communication channel is available for the first UE.

2. The method of claim 1, further comprising:

determining that the communication channel is available after receiving the first measurement report and before transmitting the data.

3. The method of claim 1, wherein the data is transmitted in the L1 resource or in a subset of the L1 resource.

4. The method of claim 1, further comprising:

sending, upon determining that the communication channel is unavailable for the first UE, a second control information message triggering the first UE to re-measure the L1 resource to determine whether the communication channel is available for the first UE.

5. The method of claim 1, wherein when the second UE apparatus has determined that the communication channel is unavailable for the first UE, the method further comprises:

receiving, from the first UE within a preset period after receiving the first measurement report, the second measurement report; and transmitting the data to the first UE upon determining, based on the second measurement report, that the communication channel is available for the first UE.

6. The method of claim 1, wherein the first measurement report indicates:

whether detected energy on the L1 resource or a subset of the L1 resource exceeds a threshold;

whether the L1 resource or the subset of the L1 resource is idle; or the detected energy on the L1 resource or the subset of the L1 resource.

7. The method of claim 1, wherein the first measurement report comprises an interference measurement indicator (IMI) indicating a measurement result of the L1 resource or a subset of the L1 resource.

8. The method of claim 1, further comprising:

transmitting information comprising any one or more of following:

a resource for reporting a resource measurement;

quasi co-location (QCL) information of a measurement resource;

a transmission configuration indication (TCI) state indicating a QCL type of the measurement resource;

a measurement time period of the resource measurement; or a measurement threshold.

9. The method of claim 1, wherein transmitting the first control information message comprises:

transmitting the first control information message to a group of UEs including the first UE to trigger each of the UEs in the group to measure a corresponding resource to determine whether the communication channel is available for a corresponding UE.

10. The method of claim 9, wherein the first control information message has cyclic redundancy check (CRC) scrambled using a group radio network temporary identifier (RNTI) associated with the group of UEs, and the first control information message comprises, for each UE, one or more of following:

the corresponding resource of the corresponding UE;

QCL information of the corresponding resource of the corresponding UE;

a measurement time window;

a measurement threshold; or a resource for reporting a measurement.

11. The method of claim 1, wherein the first control information message further comprises a field configured to request the first UE to report an L1-IM report or a CSI-RS report on the measurement of the L1 resource.

12. The method of claim 1, wherein the first control information message further comprises any one or more of following:

a channel state information-interference measurement (CSI-IM) time domain indicator indicating a CSI-IM configuration for an interference measurement;

a parameter Periodicity-and-Offset indicating a periodicity and a timing offset for the interference measurement and reporting; or a parameter IMI Bit Length indicating a number of bits used to encode a measurement result of the interference measurement.

13. The method of claim 1, wherein the first control information message further includes identification information of a group of destination UEs, and the apparatus receives the first measurement report based on the first UE being in the group of destination UEs identified by the identification information in the first control information message.

14. A method comprising:

receiving, by a user equipment (UE), a first control information message triggering the UE to measure a layer 1 (L1) resource to determine whether a communication channel in a shared spectrum is available for the UE;

performing, by the UE upon triggered by the first control information message, a first measurement of received energy on the L1 resource;

generating, by the UE, a first measurement report based on the first measurement;

transmitting, by the UE, the first measurement report;

receiving, by the UE when the communication channel is available for the UE, data in the communication channel of the shared spectrum after transmitting the first measurement report;

transmitting, by the UE, a negative acknowledge (NACK) message indicating that the data is not successfully received by the UE;

performing, by the UE, a second measurement of received energy on the L1 resource to determine whether the communication channel is available;

transmitting, by the UE, a second measurement report, the second measurement report based on the second measurement; and receiving, by the UE after transmitting the second measurement report, the data retransmitted in the communication channel of the shared spectrum.

15. The method of claim 14, further comprising:

receiving, by the UE when the communication channel is unavailable for the UE, a second control information message triggering the UE to re-measure the L1 resource to determine whether the communication channel is available.

16. An apparatus comprising:

a non-transitory memory storage comprising instructions; and one or more processors in communication with the non-transitory memory storage, wherein the instructions, when executed by the one or more processors, cause the apparatus to perform:

determining whether a communication channel in a shared spectrum is clear for use when data is to be sent to a first user equipment (UE) by the apparatus;

sending, upon determining that the communication channel is clear, a first control information message triggering the first UE to measure a layer 1 (L1) resource to determine whether the communication channel is available for the first UE;

receiving, from the first UE after sending the first control information message, a first measurement report of measurement of the L1 resource;

determining whether to transmit the data to the first UE in the communication channel based on the first measurement report;

transmitting, based on the first measurement report that the communication channel is available for the first UE, the data to the first UE in the communication channel;

receiving from the first UE a negative acknowledge (NACK) message indicating that the data has not been successfully received by the first UE;

receiving, from the first UE after receiving the NACK message, a second measurement report of measurement of the L1 resource; and retransmitting the data to the first UE in the communication channel when determining, based on the second measurement report, that the communication channel is available for the first UE.

* * * * *